United States Patent [19]

Uchiyama et al.

[11] 4,131,350
[45] Dec. 26, 1978

[54] EXPOSURE CONTROL DEVICE FOR CAMERA

[75] Inventors: Takashi Uchiyama, Yokohama; Ryoichi Suzuki, Kawasaki; Tokuichi Tsunekawa, Yokohama; Hiroyoshi Kawana; Yusuke Ono, both of Tokyo; Mutsuhide Matsuda, Yokohama, all of Japan

[73] Assignee: Canon Kabushiki Kaisha, Tokyo, Japan

[21] Appl. No.: 839,832

[22] Filed: Oct. 6, 1977

[30] Foreign Application Priority Data

Oct. 8, 1976 [JP] Japan ............................... 51-121736
Oct. 8, 1976 [JP] Japan ............................... 51-121737
Oct. 8, 1976 [JP] Japan ............................... 51-121738

[51] Int. Cl.$^2$ ............................................. G03B 7/08
[52] U.S. Cl. ........................................ 354/31; 354/51
[58] Field of Search ............... 354/24, 31, 50, 51, 354/60 R, 53, 54, 56, 289; 355/68; 356/202

[56] References Cited

U.S. PATENT DOCUMENTS 3,730,063 5/1973 Kobayashi et al. ................. 354/31

Primary Examiner—Michael L. Gellner
Attorney, Agent, or Firm—Toren, McGeady and Stanger

[57] ABSTRACT

The present invention relates to an exposure control device for a camera for obtaining a proper exposure taking the differences of the films to be used into consideration, so designed that an exposure amount control circuit for controlling an exposure amount by means of a first light measuring circuit for measuring the light reflected from the film plane is provided, while a second light measuring circuit for measuring the light reflected from the shutter plane and/or the film plane is provided in such a manner that by means of the output of the second light measuring circuit the control output value of the exposure amount control circuit is compensated so as to obtain a proper exposure amount.

13 Claims, 34 Drawing Figures

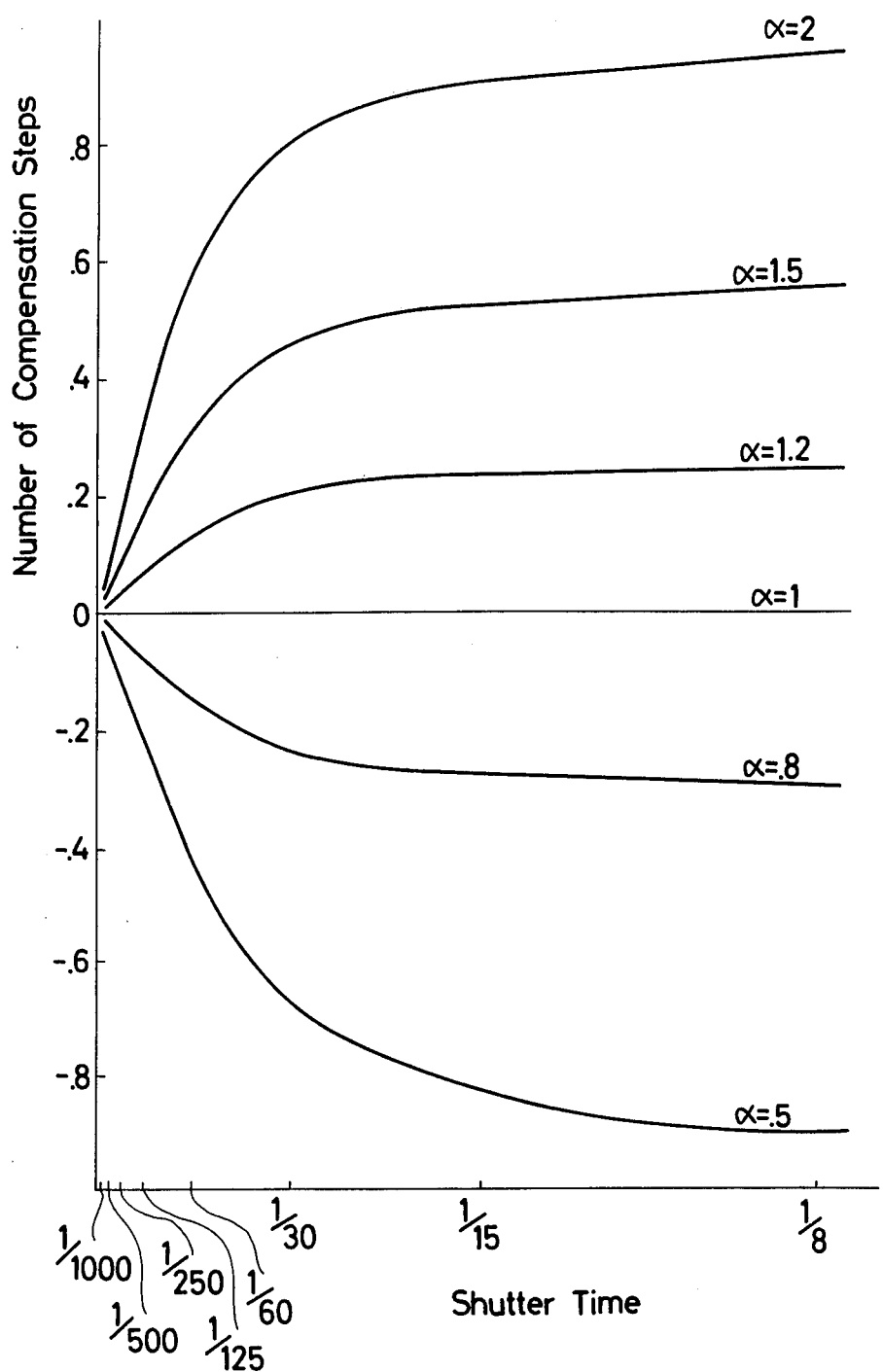

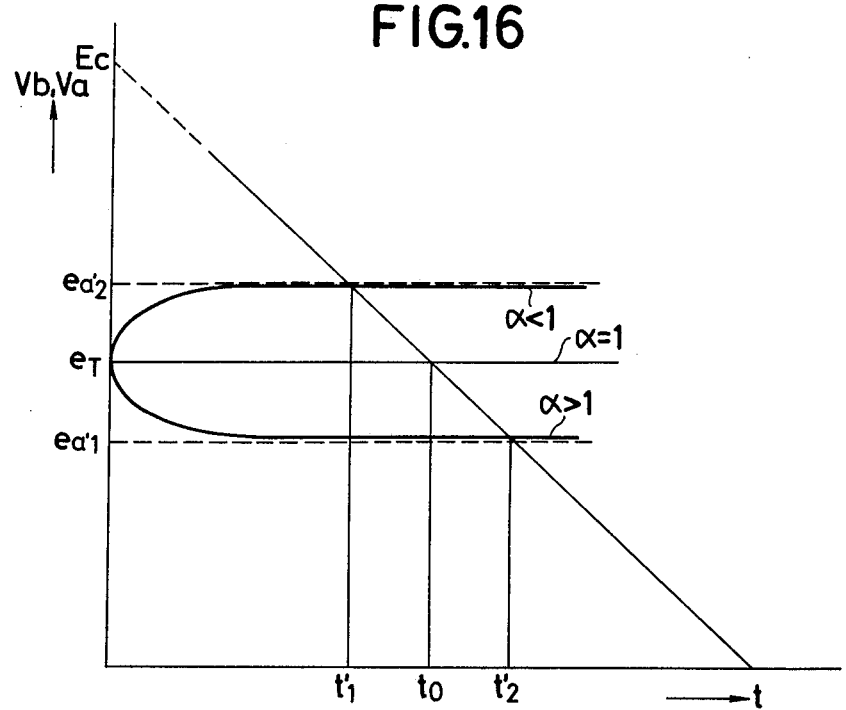
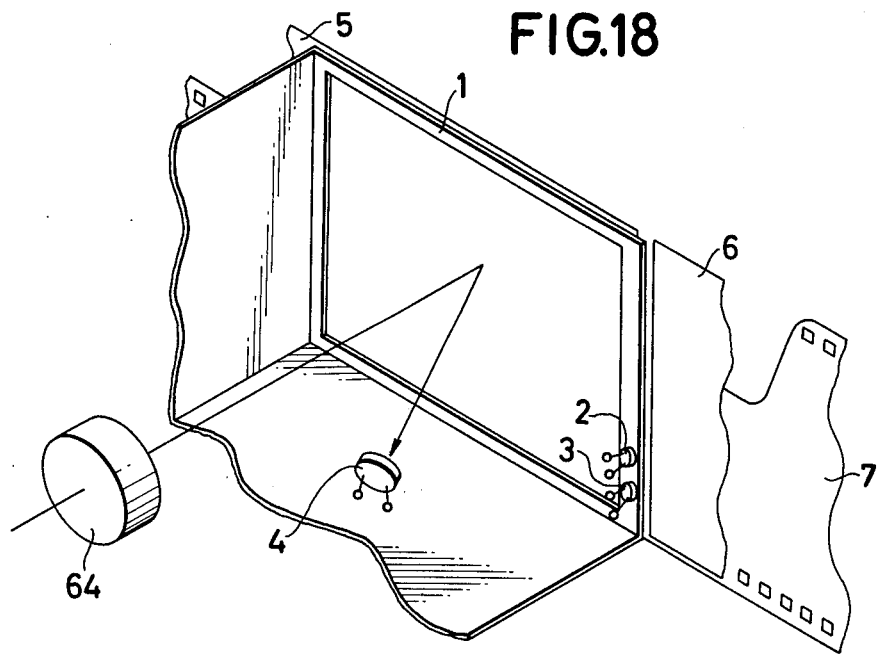

Front Shutter Plane Quick Running Start

EXPOSURE CONTROL DEVICE FOR CAMERA

BACKGROUND OF THE INVENTION

1. Field of the Invention

The present invention relates to an exposure amount control device for a camera for measuring the light reflected from the film plane, particularly for obtaining a proper exposure taking the difference of the reflexibility of the films to be used into consideration.

2. Description of the Prior Art

In case of the conventional camera for controlling the exposure amount by measuring the light reflected from the film plane the reflexibility of the film plane is supposed to be constant regardless of the kinds of the films while the reflexibility of the film plane is made equal to that of the shutter plane, whereby the light reflected from the film plane and that from the shutter plane are measured so as to control the exposure amount.

However, in reality of the reflexibility of the films normally used varies within ±0.2 step in the number of steps, so that when films with different reflexibility are loaded in a camera of the conventional film plane light measuring system, the exposure control system operates without compensating the difference of the reflexibility of films so that a proper exposure can not be obtained. Namely, even if a picture is taken with the same film sensitivity and under the same photographing conditions, the higher the reflexibility of the film plane is, the more light is sensed with the light sensing element so that the shutter closes earlier than the proper time and the exposure amount is smaller, while the lower the reflexibility of the film plane is, the less light sensed with the light sensing element so that the shutter time becomes longer than the proper one and the exposure amount is larger.

Further, in case of a camera with the conventional film plane light measuring system, the shorter the shutter time is, the larger the ratio for measuring the light reflected from the shutter plane to that reflected from the film plane is, so that although the reflexibility of the film plane is supposed to be equal to that of the shutter plane it is impossible to consider the reflexibility of the film plane equal to that of the shutter plane because the reflexibility of film is different in accordance with the kind of film, whereby it is difficult to obtain a proper exposure.

A purpose of the present invention is to eliminate the afore mentioned shortcoming by means of compensating the exposure amount with the output of the compensation light measuring circuit by providing a film plane reflexibility light measuring circuit beside the exposure control light measuring circuit for measuring the light reflected from the shutter plane and that from the film plane.

Another purpose of the invention is to compensate the exposure amount by means of a memory circuit provided in order to store the output of the film plane reflexibility compensation light measuring circuit.

Further another purpose of the present invention is to compensated the exposure amount by means of a comparison circuit provided for comparing the output of the exposure control light measuring circuit with that of the film plane reflexibility compensation light measuring circuit.

BRIEF DESCRIPTION OF THE DRAWINGS

FIG. 1 shows the characteristics for showing the number of steps of the exposure amount to be compensated, due to the difference between the reflexibility of the film plane and that of the shutter plane.

FIG. 16 shows the characteristics shown in FIG. 15, whereby the variation of the reflexibility of the film is small.

FIG. 18 shows the arrangement of the light sensing element shown in FIG. 17, whereby the light sensing element is disposed otherwise.

DESCRIPTION OF THE PREFERRED EMBODIMENT

Figure 2A:
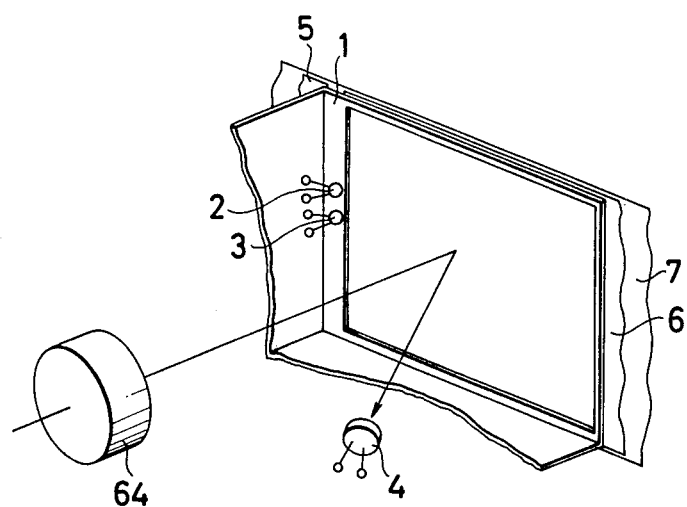
FIG. 2(a) shows the composition of the arrangement of the light sensing element of the first embodiment in accordance with the present invention.

Below the present invention will be explained in accordance with the accompanying drawings of the embodiments in accordance with the present invention, whereby firstly how the exposure amount level is to be compensated in accordance with the difference of the reflexibility of the film plane and that of the shutter plane in accordance with FIG. 1.

In FIG. 1, $$\alpha = \frac{\text{Reflexibility of Film Plane}}{\text{Reflexibility of Shutter Plane}}$$

Further, FIG. 1 shows such a typical case that the front shutter plane of the cross running focal plane shutter travels through the picture frame about 1/60 seconds, while the front as well as the rear shutter plane starts to run just from the one end of the picture frame. Hereby, the abscissa shows the shutter time value while the ordinate shows the number of steps to be compensated. In case $\alpha$ is larger than 1 ($\alpha > 1$), namely the reflexibility of the film plane is larger than that of the shutter plane, larger light amount is measured than when only the shutter plane is measured so that the shutter closes earlier than the proper time, whereby the exposure amount is insufficient.

As will be understood from the drawing, in case $\alpha$ is larger than 1 ($\alpha > 1$), the longer the shutter time is, the more positive number of steps is necessary to be compensated. Further, on the contrary, in case $\alpha$ is smaller than 1 ($\alpha < 1$), namely the reflexibility of the film plane is smaller than that of the shutter plane, smaller light amount is measured than when only the shutter plane is measured so that the shutter closes later than the proper time, whereby the exposure amount is excessive. Thus, as will be understood from the drawing, in case $\alpha$ is smaller than 1, the longer the shutter time is, the more negative number of step is to be compensated.

Secondly, the first embodiment of the present invention shown in FIG. 1 will be explained in accordance with FIGS. 2 to 6.

FIG. 2(a) as well as (b) shows the neighborhood of the picture frame of an automatic exposure control single reflex camera with priority on the diaphragm aperture, whereby 1 is the picture frame while 2 is the film plane reflexibility compensation light emitting element such as light emitting diode provided at the side of the picture frame 1, whereby the light emitting element 2 is so designed as to illuminate only the film plane outside of the picture frame, namely the part to be unexposed to the photographing light. 3 is a light sensing element such as silicone photo-cell for sensing the light emitted from the light emitting element 2 and reflected on the part of the film to be unexposed, whereby the light sensing element 3 is provided at the side of the picture frame. 5 is the rear shutter plane, 6 the front shutter plane and 7 the film. A small distance is provided between the rear end of the front shutter plane 6 and the front end of the rear shutter plane 5 in such a manner that the light emitting element 2 can illuminate the film 7 outside of the picture frame. 4 is the exposure control light sensing element for sensing the light reflected on the film plane and the front shutter plane, whereby the light sensing element 4 is provided on the bottom of the mirror box so as to measure the light within the picture frame almost evenly, consisting for example of silicone photo-cell. 64 is the photographing lens.

Figure 3:
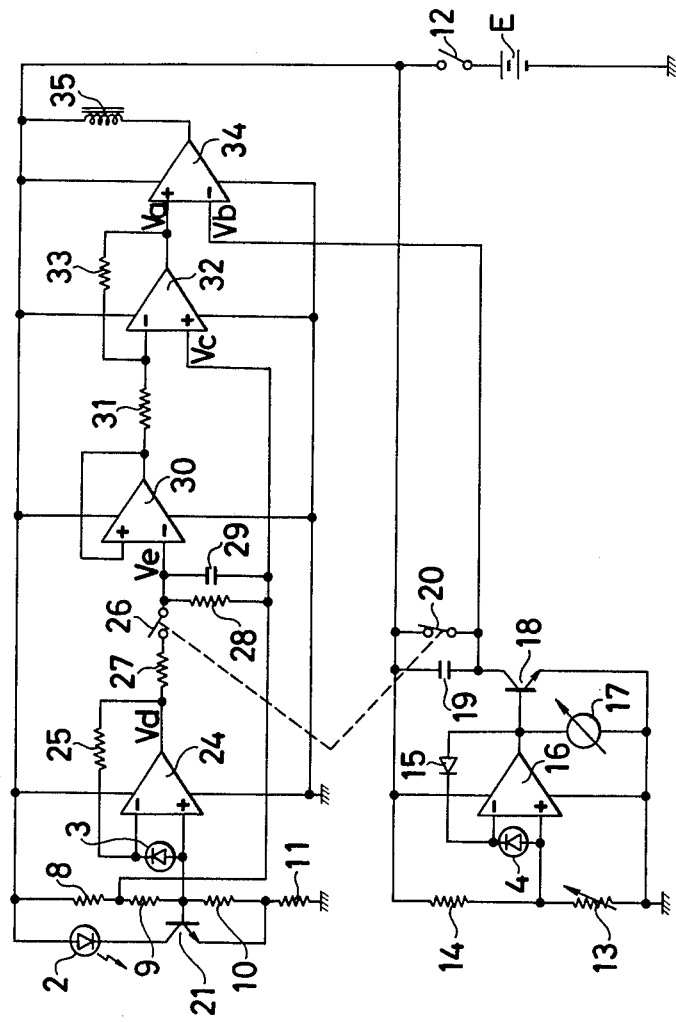
FIG. 3 shows the time control circuit to which the light sensing element shown in FIG. 2(a) (b) is connected.

FIG. 3 shows the time control circuit, whereby the elements with the same figures as in FIGS. 2(a) and (b) are the same elements. E is the power source, 12 the main switch normally opened, 13 the film sensitivity information input variable resistance, 14 a resistance, 4 the afore mentioned exposure control light sensing element, 16 an operational amplifier, 15 a logarithmically compressing diode provided in the feed back circuit of the operational amplifier, and 17 a meter for displaying the output of the operational amplifier 16, namely the shutter time.

18 is a transistor for producing a collector current corresponding to the logarithmically prolonged output voltage of the operational amplifier 16, 19 a condenser to be charged with the collector current of the transistor 18, 20 a normally closed switch for starting the counting, 2 the afore mentioned light emitting element for illuminating the film 7 outside of the picture frame, 21 a transistor connected in series with the light emitting element and 3 the afore mentioned film plane reflexibility compensation light sensing element, whereby the light sensing element 3 serves to sense the light emitted from the light emitting element 2 and reflected on the film 7 outside of the picture frame. 24 is an operational amplifier, whose output voltage varies in accordance with the light amount sensed by the afore mentioned light sensing element 3. 25 is a resistance while 26 is a normally opened switch operatively engaged with the afore mentioned switch 20 for starting the counting, whereby when the switch 26 is closed, the condenser 29 is charged with the time constant determined by the resistance 27 and the condenser 29. 28 is a resistance with a large impedance and the charge stored in the condenser is gradually discharged through the resistance 28. 30 is an impedance converting operational amplifier while 32 is an inversing operational amplifier, whereby the output voltage of the afore mentioned operational amplifier 24, which is inversedly amplified by the ratio of the resistance 31 to the resistance 33, appears at the output terminal of the operational amplifier 32. 34 is a comparision circuit, whose output voltage is kept at a low level so long as the level of the output voltage Va (the standard voltage) of the afore mentioned operational amplifier 32 is lower than that of the voltage Vb at the lower end of the afore mentioned condenser 19 and whose output voltage is inversed into a high level so as to interrupt the current supply to the magnet 35 for holding the rear shutter plane when the level of the standard voltage Va becomes higher than that of the voltage Vb. Namely, when the level of the standard voltage Va becomes equal to that of the voltage Vb, the current supply to the magnet 35 for holding the rear shutter plane is interrupted so as to release the shutter.

8, 9, 10 and 11 are the fixed resistance, whereby the ratios among the values of the resistances 8, 9, 10 and 11 have been adjusted in case $\alpha$ is equal to $1 (\alpha=1)$ in such a manner that the level of the output voltage Vd of the afore mentioned operational amplifier 24 is equal to that of the voltage Vc at the positive input terminal of the afore mentioned inversing operational amplifier 32.

Below the operation of the time control circuit constituted as stated above will be explained in detail.

With the first stroke of the shutter button not shown in the drawing the main switch 12 is closed so as to start to supply current to each circuit, whereby the switch 20 for starting the current is still closed while the switch 26 is still opened. Along with the closing of the main switch 12 the transistor 21 is brought into the switched on state and the light emitting element 2 lights up, whereby the light emitted from the light emitting element and reflected on the film plane reaches the light sensing element 3, in which a current proportional to the light amount reaching the element 3 is produced so that the output voltage Vd of the operational amplifier 24 changes accordingly. This output voltage is shifted into a level higher than Vc in case $\alpha$ is larger than 1 ($\alpha < 1$) while it is shifted into a level lower than Vc in case $\alpha$ is smaller than 1 ($\alpha < 1$). The reason is that, as afore explained, the ratios between the values of the resistances 8, 9, 10 and 11 are adjusted in such a manner that the voltage Vd is equal to that of the voltage Vc in case $\alpha$ is equal to 1 ($\alpha = 1$) so that the level of Vd is higher than that of Vc because larger light amount reaches the light sensing element 3 in case $\alpha$ is larger than $1(\alpha < 1)$, while the level of Vd is lower than that of Vc because smaller light amount reaches the light sensing element 3 in case $\alpha$ is smaller than $1(\alpha < 1)$.

Then with the second stroke of the shutter button the mirror is raised, the diaphragm of the photographing lens closed and the front shutter plane 6 starts to run, when the photographing light reflected on the shutter plane and the film plane reaches the light sensing element 4, in which a current proportional to the light amount reaching the light sensing element is produced, whereby the output voltage of the operational amplifier 16 is changed by a voltage portion logarithmically compressed so as to be proportional to the APEX value of the shutter time. The value is displayed for example in the view finder by means of the meter 17 while the output voltage is applied between the base and the emitter of the transistor 18, whereby a collector current corresponding to the logarithmically prolonged output voltage is produced.

Figure 4:
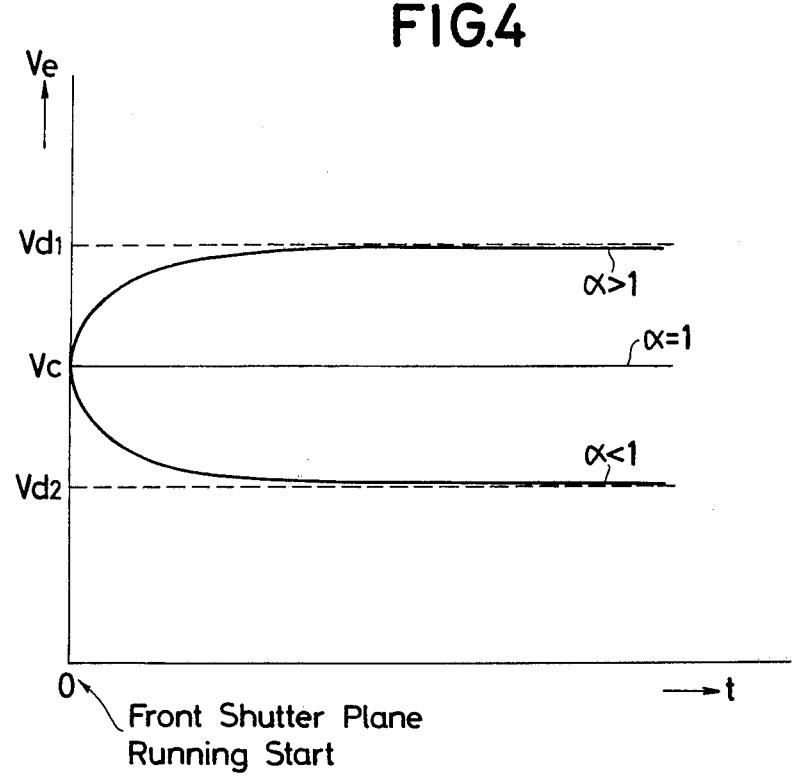
FIG. 4 shows the characteristics for showing the variation of the negative input voltage of the operational amplifier shown in FIG. 3 with reference to the lapse of time.

At the same time with the start of the front shutter plane after the termination of the mirror up operation the switch 26 is closed while the switch 20 for starting the counting is closed. When the switch 26 is closed, the condenser 29 is charged so that the voltage Ve of the negative input terminal of the impedance conversing operational amplifier 30 changes along with the lapse of time as is shown in FIG. 4. Namely, the level of Ve is higher than that of Vc because Vd is higher than Vc in case $\alpha$ is larger than 1, while the level of Ve is lower than that of Vc because Vd is lower than Vc in case $\alpha$ is smaller than 1. Hereby in the drawing, $Vd_1$ is Vd in case $\alpha$ is larger than 1 while $Vd_2$ is Vd in case $\alpha$ is smaller than 1.

This voltage Ve is amplified by means of the inversing operational amplifier 32 so as to be applied to the positive input terminal of the comparison circuit 34. Thus, the output voltage Va of the operational amplifier 32 is inversed and changes along with the lapse of time as is shown by the curve in FIG. 5 because the value of the resistance 31 is equal to that of the resistance 33.

Figure 5:
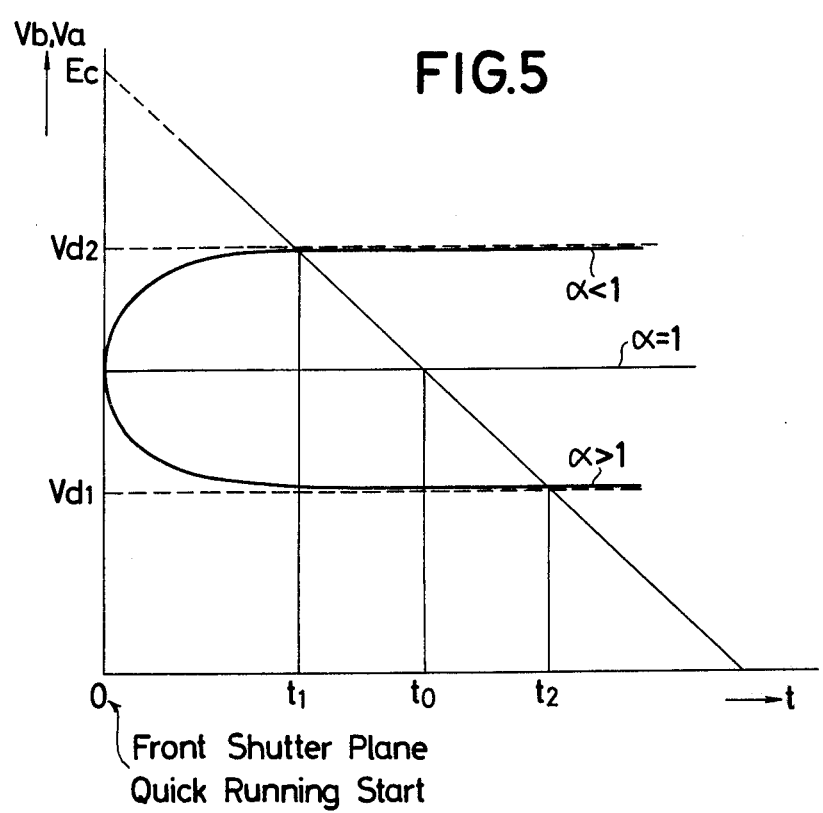
FIG. 5 shows the characteristics for showing the variation of the negative input voltage and the positive input voltage of the comparison circuit shown in FIG. 3 with reference to the lapse of time.

On the other hand at the same time with the start of the front shutter plane the count starting switch 20 is opened in operative engagement with the switch 26, when the condenser 19 is changed so that the voltage Vb applied to the negative input terminal of the comparison circuit 34 changes as is shown by the solid straight line in FIG. 5. In the drawing, Ec is the electro motive force of the power source.

When the brightness $B_1$ of the object to be photographed is represented by the voltage Vb as is shown by the straight line in FIG. 5, it is necessary that the brightness $B_2$ should be lower than $B_1$ ($B_2 < B_1$) in order that the voltage in case $\alpha$ is larger than 1 ($\alpha < 1$) represents the same straight line as in case $\alpha$ is equal to $1(\alpha = 1)$, while on the contrary, in order that the voltage in case $\alpha$ is smaller than $1(\alpha < 1)$ represents the same straight line as in case $\alpha$ is equal to 1 ($\alpha = 1$), it is necessary that the brightness $B_3$ should be lower than $B_1$ ($B_3 < B_1$). Namely, in order that the same voltage can be obtained despite of the change of $\alpha$, it is necessary that the brightness should change.

When now $\alpha$ is equal to 1, the shutter is released at $t_0$, the crossing point of the straight line in case $\alpha$ is equal to 1 with the afore mentioned solid line. It is as is explained in accordance with FIG. 5 that a proper exposure can not be obtained if the shutter is released at $t_0$ in case $\alpha$ is not equal to 1 despite that the brightness of the object to be photographed is different. A compensation against the over exposure is necessary in case $\alpha$ is larger than 1 while a compensation against the under exposure is necessary in case $\alpha$ is smaller than 1. In case of the present embodiment, the standard voltage Va is shifted downwards in case $\alpha$ is larger than 1 as is shown in FIG. 5 while the standard voltage Va is shifted upwards in case $\alpha$ is smaller than 1 so that the shutter is released at $t_2$ in case $\alpha$ is larger than 1 while the shutter is released at $t_1$ in case $\alpha$ is smaller than 1. Thus the compensation against the over exposure is automatically effected in case $\alpha$ is larger than 1 while the compensation against the under exposure is automatically effected in case $\alpha$ is smaller than 1 in such a manner that a more proper exposure amount control is possible.

Figure 6:
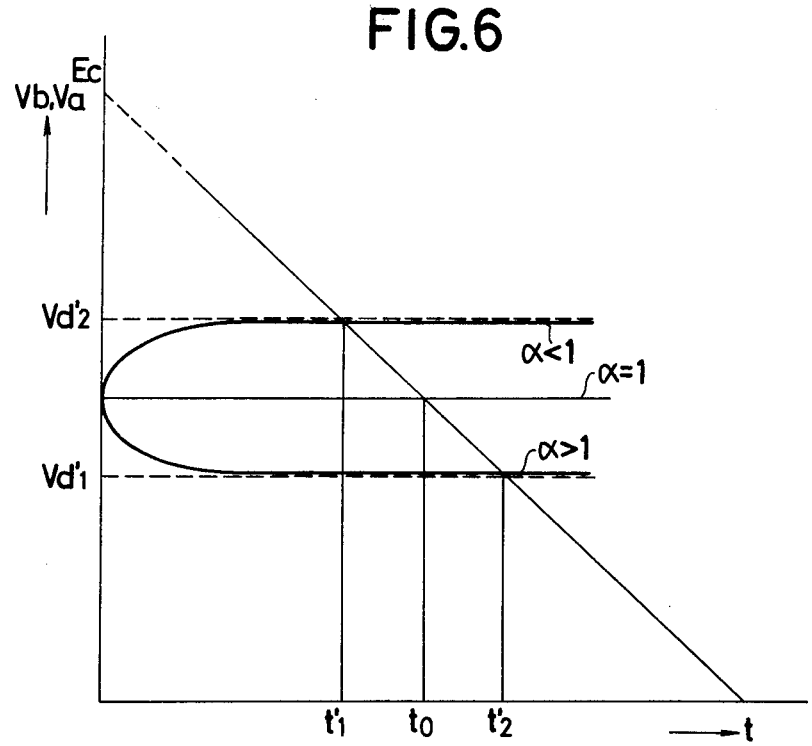
FIG. 6 shows the characteristics shown in FIG. 5, whereby the fluctuation of the reflexibility of the film is small.

FIG. 6 shows the variation of the standard voltage Va and the voltage Vb along with the lapse of time in case the deviation of α from 1 is smaller than in case shown in FIG. 5. Hereby the variation of the output voltage Vd of the operational amplifier is smaller than in case shown in FIG. 5 so that the upward shift amount or the downwards shift amount of the standard amount is also smaller. Thus the amount of the shutter time to be compensated is also smaller than in case shown in FIG. 5.

Namely, hereby the over compensation amount is ($t_2'$ − $t_0$) while the under compensation amount is ($t_0$ − $t_1'$) so that the compensation amounts are smaller than the amounts ($t_2$ − $t_0$) and ($t_0$ − $t_1$) in case shown in FIG. 5.

This means that the exposure compensation can be small when the difference between the reflexibility on the film plane and that on the shutter plane is small, which is theoretically expected. Thus, in case of the present invention, the deviation of the number of the steps of the exposure to be compensated due to the deviation of the reflexibility of the film can also be automatically compensated.

Further in accordance with the difference of the shutter time, the ratio of the light amount reflected from the film plane to that from the shutter plane varies, whereby the charging time of the condenser 19 varies accordingly in such a manner that the inclination of the straight time shown in FIGS. 5 and 6 varies so as to automatically vary the number of steps of exposure to be compensated.

Below the second embodiment of the present invention will be explained in detail in accordance with FIGS. 7 to 11, whereby the present embodiment represents the simplification of the first embodiment, while the reflexibility of the front shutter plane is chosen smaller than the smallest reflexibility among various kinds of films. Hereby the elements having the same figures as those in FIG. 1 are the same elements.

Figure 7A:
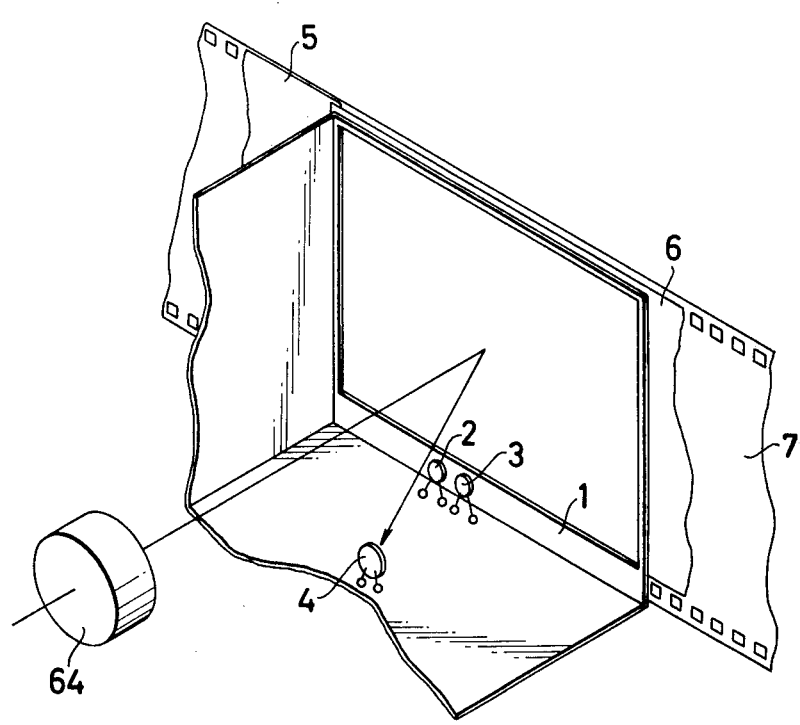
FIG. 7(a) shows the composition of the arrangement of the light sensing element of the second embodiment in accordance with the present invention.

FIGS. 7(a) and (b) show the neighborhood of the picture frame of an automatic exposure amount control single reflex camera with priority on the diaphragm aperture value, whereby 1 is the picture frame and 2 the film plane reflexibility compensation light emitting element such as light emitting diode provided at the lower part of the picture frame 1, whereby the light emitting element 2 is designed so as to illuminate only the film between adjacent perforations, namely the film portion not to be exposed to the photographing light. 3 is a light sensing element such as silicone photo-cell for sensing the light emitted from the light emitting element 2 and reflected from the film portion not to be exposed to the photographing part, being provided at the lower part of the picture frame 1. 5 is the rear shutter plane, 6 the front shutter plane and 7 the film. The reflexibility of the front shutter plane 6 is chosen smaller than the smallest reflexibility of various kinds of films to be used. 4 is the exposure control light sensing element for sensing the light reflected from the film plane and the front shutter plane, whereby the light sensing element 4 serves to carry out the light measurement in the picture frame provided on the bottom of the mirror box almost evenly, consisting for example of silicone photo-cell. 64 is the photographing lens.

Figure 8:
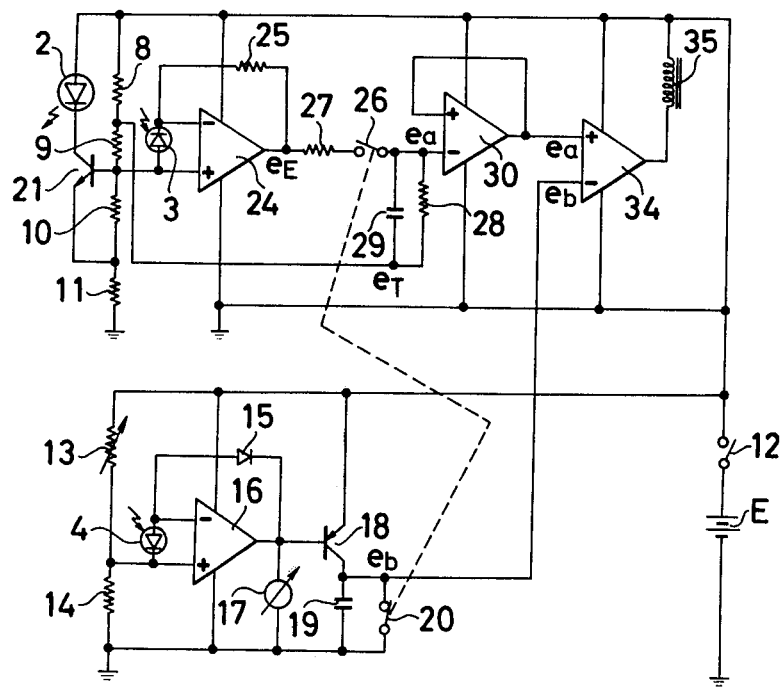
FIG. 8 shows the time control circuit to which the light sensing element shown in FIG. 7(a) (b).

FIG. 8 shows a time control circuit, whereby the elements having the same figures as those in FIGS. 7(a) and (b) are the same elements. E is the power source, 12 the main switch normally opened, 13 the film sensitibity information input variable resistance, 14 a resistance, 4 the afore mentioned exposure control light sensing element, 16 an operational amplifier, 15 the logarithmically compressing diode provided in the feed back circuit of the operational amplifier, and 17 a meter for displaying the output of the operational amplifier 16, namely the shutter time. 18 is a transistor for producing a current corresponding to the logarithmically prolonged output voltage of the operational amplifier 16, 19 the condenser to be charged with the collector current of the transistor 18, 20 the normally closed switch for starting the counting, 2 the afore mentioned light emitting element for illuminating the film portion 7 not to be exposed, 21 a transistor connected in series with the light emitting element, and 3 the afore mentioned film plane reflexibility compensating light sensing element for sensing the light emitted from the light emitting element 2 and reflected from the film to be unexposed. 24 is an operational amplifier, whose output voltage varies in accordance with the light amount sensed by the afore mentioned element 3. 26 is a normally opened switch operatively engaged with the switch 20 for starting the counting, whereby when the switch 26 is closed, the condenser 29 is charged with the time constant determined by the resistance 27 and the condenser 29.

28 is a resistance with high impedance, through which the charge stored in the condenser 29 is gradually discharged. 30 is an impedance conversing operational amplifier, while 34 is a comparing circuit, whose output voltage is kept on the low level to supply current to the rear shutter plane holding magnet 35, so long as the level of the output voltage $e_a$ (the standard voltage) of the afore mentioned operational amplifier 17 is higher than that of the voltage $e_b$ at the upper end of the afore mentioned condenser 19 and whose output in inversed into a high level so as to interrupt the current supply to the rear shutter plane holding magnet 35 when the level of the standard voltage $e_a$ becomes higher than the voltage $e_b$. Namely, when the level of the standard voltage $e_a$ becomes equal to that of the voltage $e_b$, the current supply to the rear shutter plane holding magnet 35 is interrupted so as to release the shutter.

The resistance 8, 9, 10 and 11 are the fixed resistances, whereby the ratio of the values among the resistances 8, 9, 10 and 11 have been adjusted in advance in such a manner that the level of the output voltage $e_E$ of the afore mentioned amplifier 24 becomes equal to that of the voltage $e_T$ at the lower end of the afore mentioned condenser 15 in case α is equal to 1, namely the reflexibility of the film plane is equal to that of the shutter plane.

Below the operation of the time control circuit constituted as constituted above will be explained in detail.

With the first stroke of the shutter button not shown in the drawing the main switch 12 is closed so as to start the current supply to each circuit, whereby the switch 20 for starting the counting is still closed while the switch 26 is still opened. With the closing of the main switch 12 the transistor 21 is brought into the switched on state and the light emitting element 2 lights up, whereby the light emitted from the light emitting element 2 and reflected from the film plane reaches the light sensing element 3, in which a current proportional to the light amount sensed by means of the light sensing element 3 is produced so that the output voltage $e_E$ of the operational amplifier 24 varies accordingly. This output voltage is always shifted into a level higher than that of the voltage $e_T$ because $\alpha$ is larger than 1. The reason is that the ratios among the values of the resistances 8, 9, 10 and 11 have been adjusted in advance in such a manner that the level of the voltage $e_E$ is equal to that of the voltage $e_T$ when $\alpha$ is equal to 1 so that when $\alpha$ is larger than 1, a larger light amount is sensed by means of the light sensing element 3, whereby the level of $e_E$ is shifted into a level higher than that of $e_T$. When then with the second stroke of the shutter button the mirror is raised up, the diaphragm of the photographing lens is closed and the front shutter plane 6 starts to run, the light sensing element 4 senses the photographing light reflected from the shutter plane and the film plane so as to produce a current proportional to the sensed light amount in such a manner that the output voltage of the operational amplifier 16 is varied by the voltage portion logarithmically compressed so as to be proportional to the APEX value of the shutter time. The APEX value is displayed for example in the view finder by means of the meter 17, while the output voltage is applied between the base and the emitter of the transistor 18 so as to produce a collector current corresponding to the logarithmically prolonged output voltage.

Figure 9:
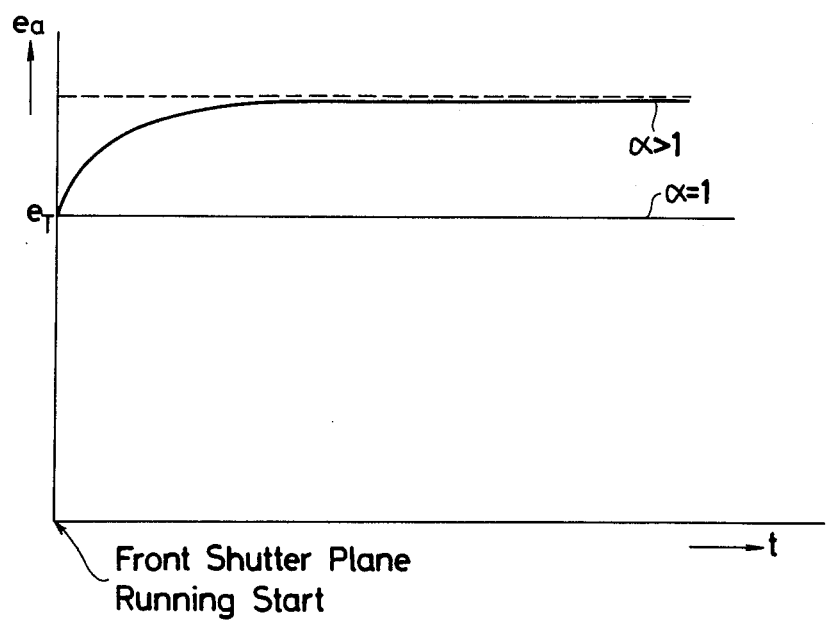
FIG. 9 shows the characteristics for showing the variation of the negative input voltage of the operational amplifier shown in FIG. 8 with reference to the lapse of time.

Synchronized with the start of the front shutter plane after the termination of the mirror up operation, the switch 26 is closed while the switch 20 for starting the counting is opened. With the closing of the switch 26 the condenser 29 is charged so that the voltage $e_a$ at the negative input terminal of the impedance conversing operational amplifier 30 varies along with the lapse of time as is shown in FIG. 9. Namely, because $\alpha$ is always larger than 1, $e_E$ is larger than $e_T$ so that the level of $e_E$ is higher than that of $e_T$. The then variation is shown in curve in FIG. 10.

Figure 10:
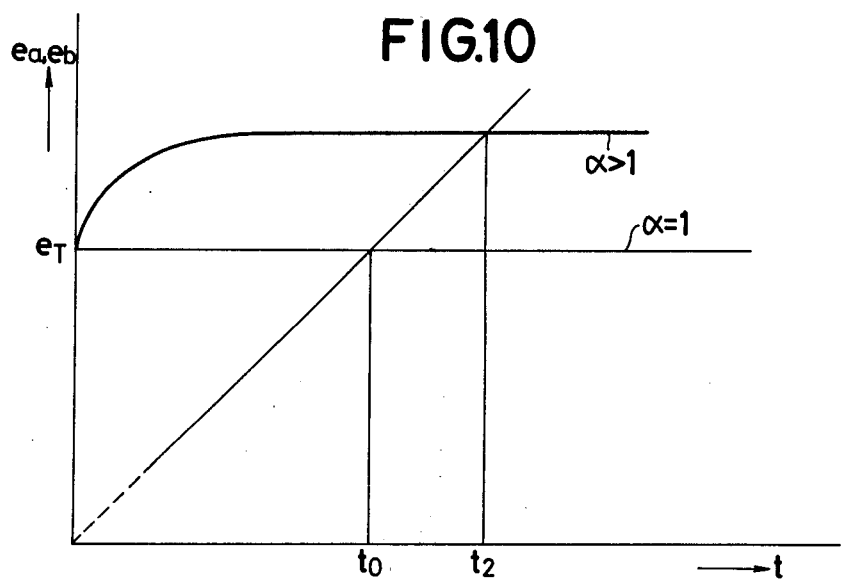
FIG. 10 shows the characteristics for showing the variation of the negative input voltage and the positive input voltage of the comparison circuit shown in FIG. 8 with reference to the lapse of time.

On the other hand, the switch 20 for starting the counting is opened, in operative engagement with the switch 26 at the same time with the start of the front shutter plane, whereby the condenser 19 is charged so that the voltage $e_b$ applied to the negative input terminal of the commparison circuit 34 changes as is shown in a solid line in FIG. 10. In FIG. 10 in order to obtain a same voltage despite of the variation of $\alpha$ it is necessary for the brightness of the object to be photographed to change. In case now $\alpha$ is equal to 1, the shutter is released at the crossing point $t_0$ of the line ($\alpha = 1$) with the afore mentioned solid line. Hereby, it is as is explained in accordance with FIG. 1 that a proper exposure can not be obtained when the shutter is released at $t_0$ despite of that the brightness of the object to be photographed is different in case $\alpha$ is not equal to 1. When $\alpha$ is larger than 1, the over exposure compensation is necessary.

In case of the present embodiment $\alpha$ is larger than 1 as is shown in FIG. 10 so that the standard voltage $e_a$ is shifted upwards so as to release the shutter. Thus, in case $\alpha$ is larger than 1, the positive compensation is automatically effected so as to enable a more proper exposure amount control.

Figure 11:
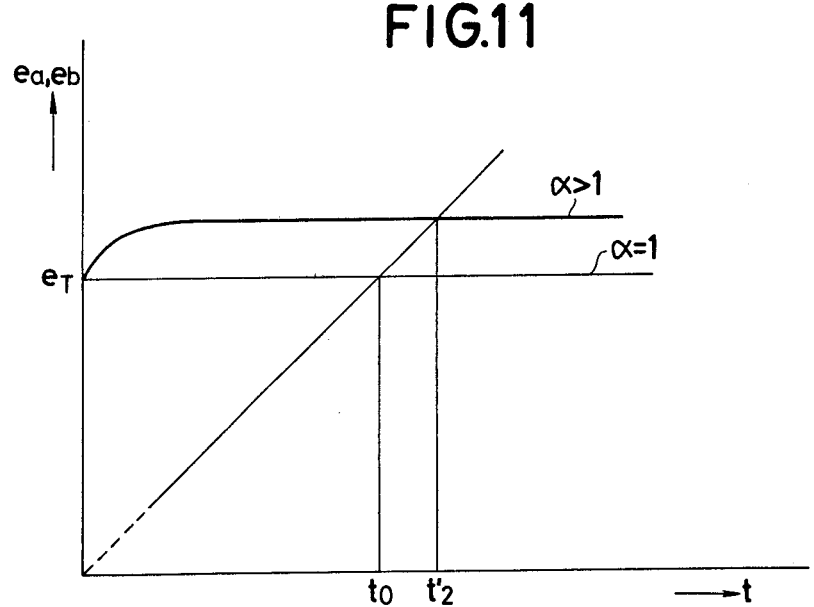
FIG. 11 shows the characteristics shown in FIG. 10, whereby the fluctuation of the flexibility of the film is small.

FIG. 11 shows the variation of the standard voltage Va and the voltage Vb along with the lapse of time in case the deviation of $\alpha$ from 1 is smaller than in the case shown in FIG. 10. In this case the variation of the output voltage $e_E$ of the operational amplifier 30 is smaller than in the case shown in FIG. 10 so that the upward shift amount of the standard voltage $e_a$ is also smaller. Thus the compensation amount of the shutter time is also smaller than in the case shown in FIG. 5. Namely, in this case the over exposure compensation is ($t_2' - t_0$), which is smaller than ($t_2 - t_0$), the compensation amount in the case shown in FIG. 10.

This means that the exposure compensation amount can be small in case the difference between the reflexibility of the film plane and that of the shutter plane is small, which is theoretically expected.

Further, the ratio of the light reflected from the film plane and that reflected from the shutter plane is different when the shutter time is different, whereby the changing time of the condenser 19 changes in such a manner that the inclination of the straight line shown in FIG. 10 and 11 changes so that the number of the steps of the exposure to be compensated is also automatically changed.

Figure 2B:
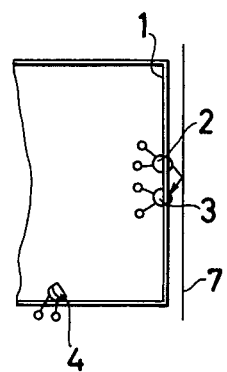
FIG. 2(b) shows a side view of FIG. 2(a).
Figure 7B:
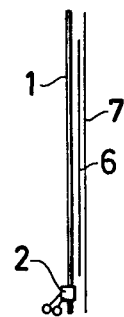
FIG. 7(b) shows the side view of FIG. 7(a).

Hereby, in case of the embodiment shown in FIG. 2, the light measurement is carried out between adjacent perforations as film portion not to be exposed as is shown in FIG. 7, whereby the light measurement can also be effected over the film portion between adjacent portions to be exposed for photographing. Further, the light measuring system shown in FIG. 7 can also be applied to the first embodiment.

In case of the afore mentioned embodiments, the reflexibility compensation light sensing element 3 senses the light reflected from the film plane, whereby it goes without saying that the light sensing element 3 can be provided behind the film so as to sense the light coming through the film.

Below the third embodiment in accordance with the present invention will be explained in accordance with FIGS. 12 to 16, whereby the members having the same figures as those of the first and the second embodiment are the same members.

Figure 12:
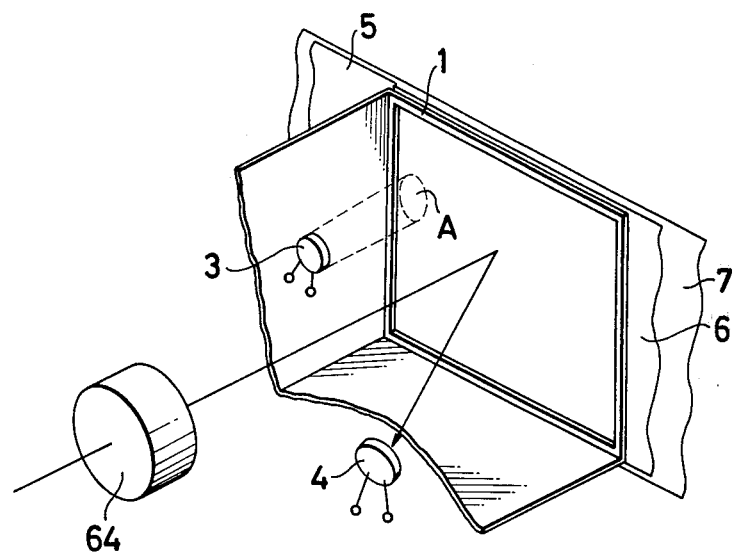
FIG. 12 shows the disposition of the light sensing element of the third embodiment in accordance with the present invention.

FIG. 12 shows the neighborhood of the picture frame of an automatic exposure control camera with priority on diaphragm aperture, whereby 1 is the picture frame and 3 the reflexibility compensating light sensing element for measuring the difference between the reflexibility of the shutter plane and that of the film plane, consisting of for example silicone photocell, whereby only the part A in the drawing is measured. 4 is the exposure control light sensing element for sensing the light reflected from the film plane and the front shutter plane and is intended to carry out the light mmeasuring within the film frame evenly. 5 is the rear shutter plane, 6 the front shutter plane and 7 the film. 64 is the photographing lens.

Figure 13:
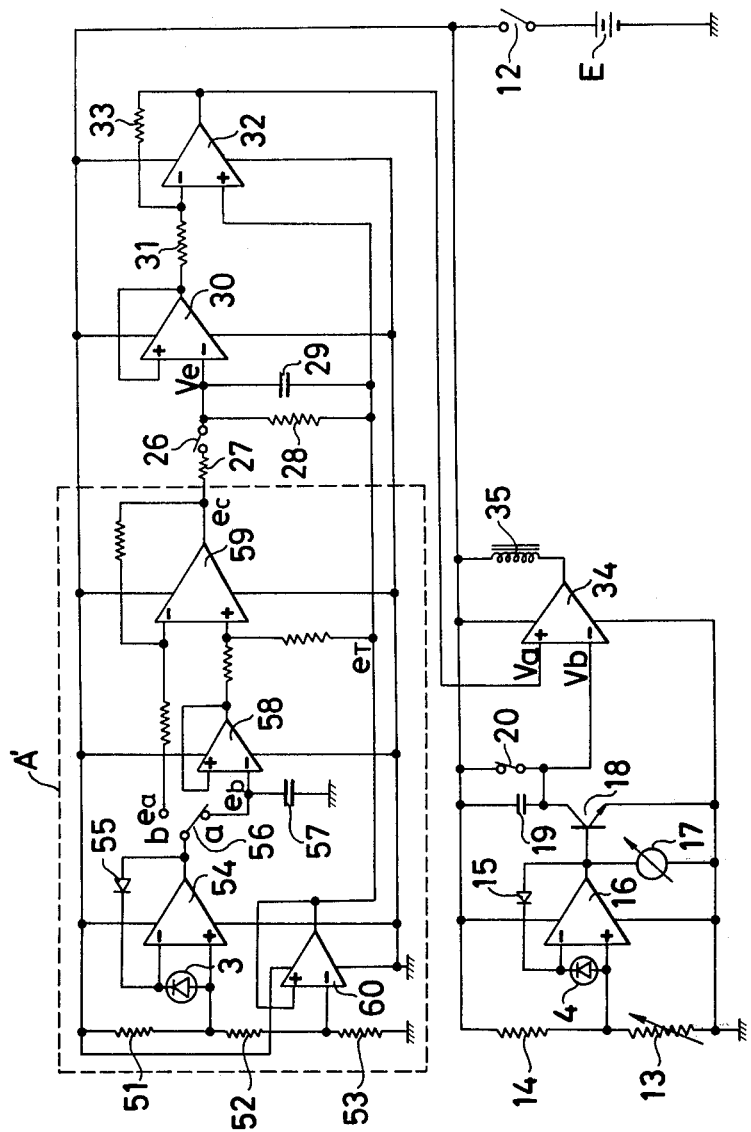
FIG. 13 shows the time control circuit to which the light sensing element shown in FIG. 12 is connected.

FIG. 13 shows the time control circuit, whereby the members having the same figures as those in FIG. 2 are the same members. E is the power source, 12 the normally opened main switch, 13 the film sensitibity information input variable resistance, 14 a resistance, 4 the afore mentioned exposure control light sensing element, 16 an operational amplifier, 15 a logarithmically compressing diode provided in the feed back circuit of the operational amplifier 16 and 17 the meter for displaying the output of the operational amplifier 16, namely the shutter time. 18 is a transistor for producing a collector current corresponding to the logarithmically prolonged output voltage of the operational amplifier 16, 19 a condenser to be charged with the collector current of the transistor 18, 20 a normally closed switch for starting the counting, 3 the afore mentioned film plane reflexibility compensation light sensing element and 54 an operational amplifier, whose output voltage varies in accordance with the light amount sensed by means of the afore mentioned light sensing element. 55 is a logarithmically compressing diode provided in the feed back circuit of the operational amplifier 54 and 56 a change over switch normally connected to the a side and to be changed over to the b side in operative engagement with the start of the front shutter plane. 57 is a condenser for memorizing the output voltage of the operational amplifier 54 corresponding to the light reflected from the front shutter plane, 58 the impedance conversion operational amplifier and 59 the differential operational amplifier. 51, 52 and 53 are fixed resistance while 60 is an impedance conversion operational amplifier, whereby the resistances 51, 52 and 53 have been so adjusted that the output voltage of the operational amplifier 60 is the standard level voltage $e_T$. 26 is a normally opened switch in operative engagement with the afore mentioned switch 20 for starting the counting, whereby when the switch 26 is closed, the condenser 29 is charged with a time constant determined by the resistance 27 and the condenser 29. 28 is a resistance with a high impedance, whereby the charge stored in the condenser 29 is gradually discharged through the resistance 28. 30 is an impedance conversion operational amplifier, while 32 is an inversing operational amplifier, whereby the output voltage of the afore mentioned operational amplifier 30 is inversedly amplified at a ratio of the resistance 31 to that 33 so as to appear at the output terminal of the operational amplifier 32. 34 is a comparison circuit, whereby so long as the level of the output voltage Va (the standard voltage) of the afore mentioned amplifier 32 is lower than the voltage Vb at the lower end of the afore mentioned condenser 19, the level of the output voltage of the comparison circuit 34 is kept low so as to allow the passage of the current to the rear shutter plane holding magnet 35 while so long as the level of the standard voltage Va is higher than that of the voltage Vb the output voltage of the afore mentioned comparison circuit 34 is inversed into a high level so as to interrupt the current supply to the rear shutter plane holding magnet 35. Namely, when the level of the standard voltage Va is equal to that of the voltage Vb the current supply to the rear shutter plane holding magnet 35 is interrupted so as to release the shutter.

Below the operation of the above mentioned circuit will be explained. With the first stroke of the shutter button shown in the drawing current is supplied to each part of the time control circuit so as to bring the circuit into an operative state, whereby the switch 20 is still closed and further the switch 26 is still closed while the change over switch 56 is connected to the a side. With the second stroke of the shutter button, a mirror not shown in the drawing is raised up, when the photographing light reflected from the front shutter plane 6 reaches the afore mentioned reflexibility compensating light sensing element 3, whereby a voltage $e_b$ corresponding to a logarithm of the then sensed light amount is applied to the a side of the operational amplifier 54 so that the afore mentioned memory condenser 57 is charged while the input voltage $e_b$ at the negative input terminal of the afore mentioned inpedance conversing operational amplifier 58 becomes $e_b$ in such a manner that the voltage at the positive input terminal voltage $e_b$ of the afore mentioned differential operational amplifier 59 becomes also $e_b$.

When then the front shutter plane starts to run, a film plane appears at the part A in FIG. 12 so that the reflexibility compensating light sensing element 3 senses the light reflected from the film plane so that the operational amplifier 54 produces a voltage $e_a$ corresponding to the logarithm of the light reflected from the film plane. Hereby, at the same time with the start of the front shutter plane the change over switch 56 is connected to the b side so that the negative input voltage of the differential operational amplifier 59 becomes $e_a$. Hereby, the resistances 51, 52 and 53 have been adjusted in advance in such a manner that the output voltage of the impedance conversion operational amplifier 60 is $e_T$, so that the output voltage $e_c$ of the afore mentioned differential operational amplifier 59 is represented as follows $$e_c = e_T + (e_b - e_a).$$

Figure 14:
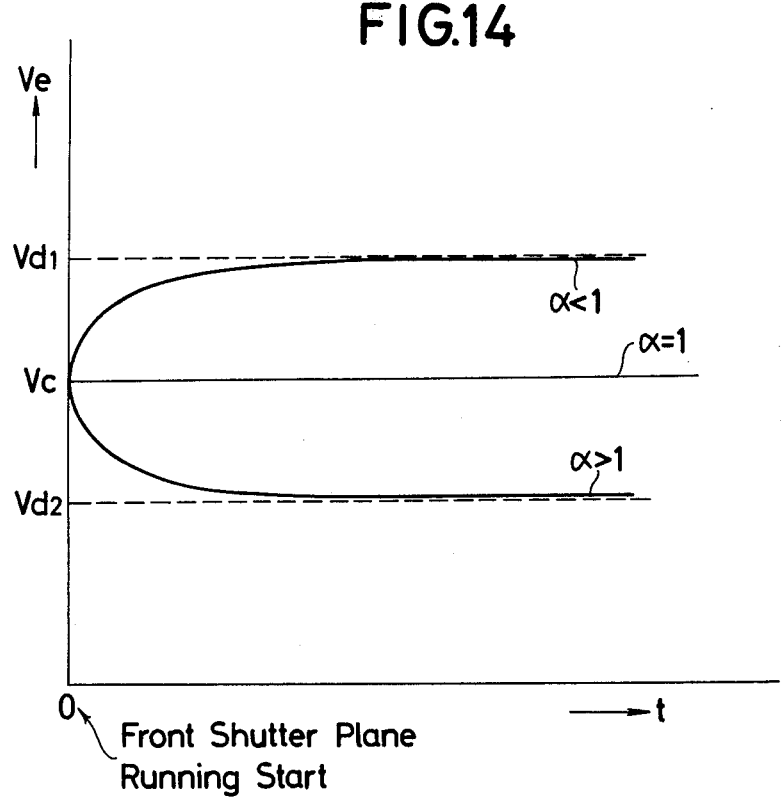
FIG. 14 shows the characteristics for showing the variation of the negative input voltage of the operational amplifier shown in FIG. 13 with reference to the lapse of time.

Thus, the condenser 29 is charged in accordance with the voltage ($e_b - e_a$) through a switch 26 to be closed in synchronization of the front shutter plane. In consequence, the voltage Ve at the negative input terminal of the impedance conversion operational amplifier 30 varies along with the lapse of time as is shown in FIG. 14. Namely, in case $\alpha$ is larger than 1, $e_a$ is larger than $e_b$ so that the level of $e_a$ is higher than that of $e_b$, while in case $\alpha$ is smaller than 1, $e_a$ is smaller than $e_b$ so that the level of $e_a$ is lower than $e_b$. Hereby, $ea_1$ in FIG. 14 represents $e_a$ in case $\alpha$ is larger than 1, while $ea_2$ repesents $e_a$ in case $\alpha$ is smaller than 1.

On the other hand, the light sensing element 4 senses the photographing light reflected from the shutter plane and the film plane so as to produce a current proportional to the sensed light amount, whereby the output voltage of the operational amplifier 16 is varied by the logarithmically compressed output voltage so as to be proportional to the APEX value of the shutter time. The value is displayed by means of the meter 17 for example in the view finder, while the output voltage is applied between the base and the emitter of the transistor 18, so as to produce a collector current corresponding to the logarithmically prolonged output voltage. The switch 20 for starting the counting is opened at the same time with the start of the front shutter plane, so that the condenser 19 is charged whereby the charge voltage is applied to the negative input terminal of the comparison circuit 34. At this time the voltage Vb varies as is shown in the straight line in FIG. 15. In the drawing, Ec shows the electromotive force of the power source. Further to the positive input terminal of the comparison circuit 34, the voltage Ve is applied, being inversedly amplified by means of the operational amplifier 32. This input voltage Va varies along with the lapse of time as is shown in the curve in FIG. 15.

Figure 15:
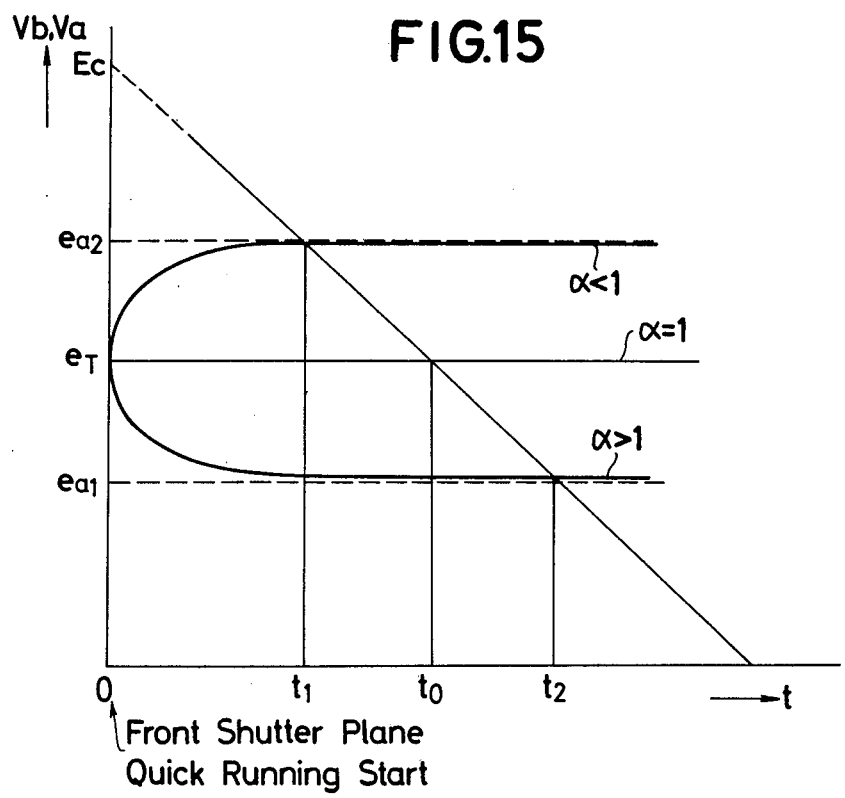
FIG. 15 shows the characteristics for showing the variation of the negative input voltage and the positive input voltage of the comparison circuit 34 shown in FIG. 13 with reference to the lapse of time.

In FIG. 15, it is necessary that the brightness of the object to be photographed should vary in order to obtain a same voltage despite of the variation of $\alpha$.

When now $\alpha$ is equal to 1, it is natural that the shutter is released at the crossing point $t_O$ of the straight line ($\alpha = 1$) with the straight line. It is as is explained in accordance with FIG. 1 that a proper exposure can not be obtained when the shutter is released at $t_0$ despite that the brightness of the object to be photographed is different in case $\alpha$ is not equal to 1. In case $\alpha$ is larger than 1, the over compensation is necessary while in case $\alpha$ is smaller than 1, the under compensation is necessary. In case of the present embodiment, the standard voltage Va is shifted downwards in case $\alpha$ is larger than 1 as is shown in FIG. 15, while it is shifted upwards in case $\alpha$ is smaller than 1 so that the shutter is released at $t_2$ in case $\alpha$ is larger than 1, while the shutter is released at $t_1$ in case $\alpha$ is smaller than 1. Thus, the positive compensation is automatically effected in case $\alpha$ is larger than 1, while the negative compensation is automatically effected in case $\alpha$ is smaller than 1 in such a manner that a more proper exposure amount control is possible.

FIG. 16 shows the variation of the standard voltage Va and the voltage Vb along with the lapse of time in case the deviation of $\alpha$ from 1 is smaller than in the case shown in FIG. 15. In this case the variation of the output voltage $e_c$ of the operational amplifier is smaller than in the case shown in FIG. 15 so that the upward as well as the downward shift amount of the standard voltage Va are also smaller.

Further the ratio of the light reflected from the film plane to that from the shutter plane varies in accordance with the variation of the shutter time, whereby the charging voltage of the condenser 19 varies and therefore the inclination of the straight line shown in FIGS. 15 and 16 varies so that the number of the steps of the exposure to be compensated is automatically varied.

Below, the fourth embodiment in accordance with the present invention will be explained in detail in accordance with FIGS. 17 to 23, whereby the members having the same figures as of the afore mentioned embodiment are the same members.

Figure 17A:
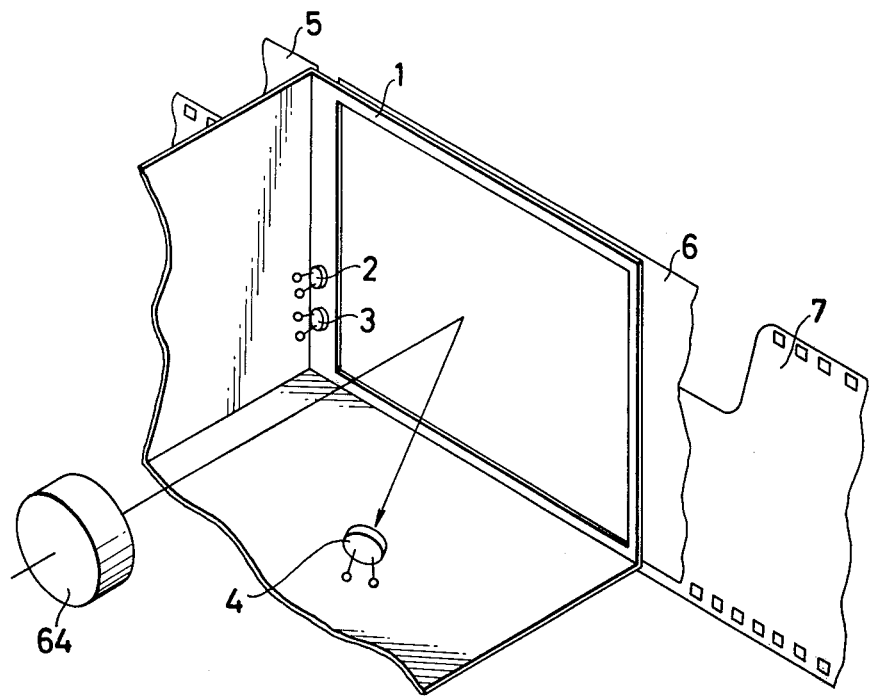
FIG. 17(a) shows the composition of the arrangement of the light sensing element of the fourth embodiment in accordance with the present invention.

FIGS. 17(a) and (b) show the neighborhood of the picture frame of an automatic exposure control single reflex camera with priority on the diaphragm aperture, whereby 1 is the picture frame, 2 the film plane reflexibility compensating light emitting element such as LED provided at the side of the picture frame, so designed as to illuminate only the leader portion of film, namely the film portion not to be exposed to the photographing light. 3 is a light sensing element such as silicone photocell for sensing the light emitted from the light emitting element 2 and reflected from the film plane not to be exposed, being provided on the picture frame 1. 5 is the rear shutter plane, 6 the front shutter plane and 7 the film. Some distance is provided between the rear end of the front shutter plane 6 and the front end of the rear shutter plane 5 in such a manner that the light emitting element 2 can illuminate the leader part of the film in the charged state of the shutter. 4 is the exposure control light sensing element for sensing the light reflected from the film plane and the front shutter plane, being provided on the bottom of the mirror box so as to measure within the picture frame evenly. 64 is the photographing lens.

Figure 17B:
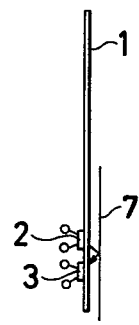
FIG. 17(b) shows the side view of FIG. 17(a).

FIG. 18 shows the neighborhood of the picture frame of an automatic exposure control single reflex camera with priority on the diaphragm aperture, whereby the light emitting element 2 and the light sensing element 3 are arranged contrary to the disposition shown in FIG. 17, whereby the member having the same figures as in the embodiment shown in FIG. 17 are the same member. Hereby, FIG. 18 shows the case before the shutter has been charged, whereby a space exists between the rear end of the front shutter plane and the front end of the rear shutter plane.

Figure 19:
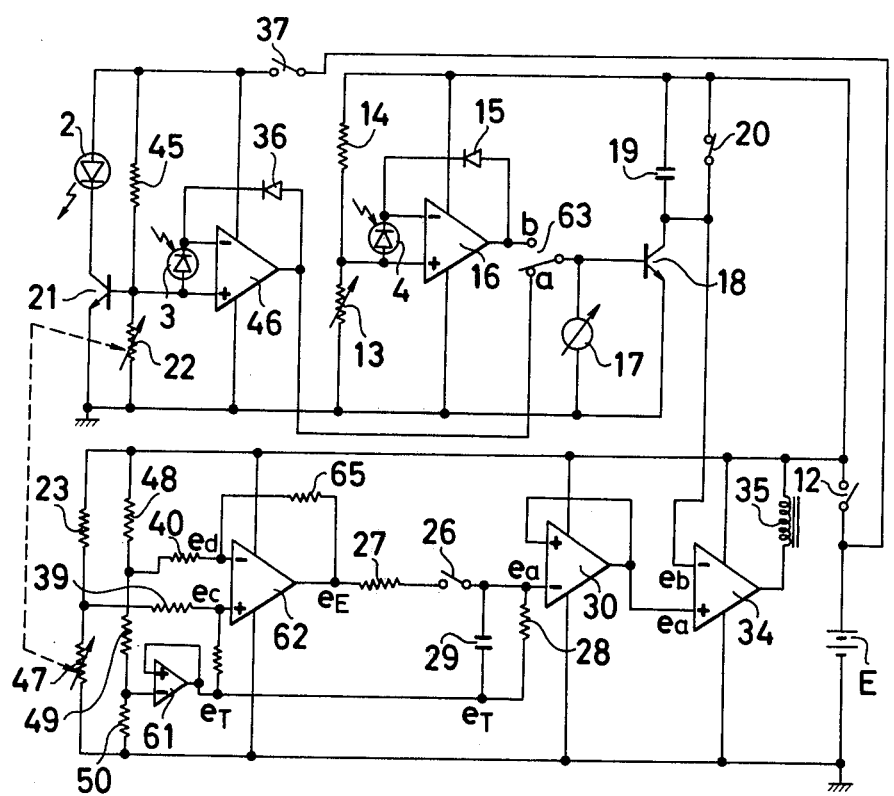
FIG. 19 shows the exposure amount control circuit to which the light sensing element shown in FIG. 17(a) (b) or in FIG. 18 is connected.

FIG. 19 shows a time control circuit, whereby E is a power source, 12 a normally opened main switch, 13 the film sensitivity information input variable resistance, 14 a resistance, 4 the afore mentioned exposure control light sensing element, 16 an operational amplifier, 15 a logarithmically compressing diode provided in the feed back circuit of the operational amplifier 16 and 17 a meter for displaying the output of the operational amplifier 16, namely the shutter time. 18 is a transistor for producing a collector current corresponding to the logarithmically prolonged voltage of the operational amplifier 16, 19 a condenser to be charged with the collector current of the transistor 18 and 20 a normally closed switch for starting the counting. 63 is a change over switch, whereby when the switch is connected to the b contact, the output terminal of the operational amplifier 16 of the afore mentioned exposure control light measuring circuit is connected to the meter 17, while when the switch is connected to the a contact, the output terminal of the operational amplifier 46 of the reflexibility compensation light measuring circuit to be explained is connected to the meter. 2 is the afore mentioned light emitting element for illuminating the leader part of the film 7, 21 a transistor connected in series with the light emitting element and 3 a film plane reflexibility compensation light sensing element for sensing the light emitted from the light emitting element 2 and reflected from the leader part of the film 7. 46 is an operational amplifier whose output voltage varies in accordance with the light amount sensed by means of the afore mentioned light sensing element 3. 36 is a logarithmically compressing diode provided in the feed back circuit of the operational amplifier 46 and 37 the power source switch of the reflexibility compensation light measuring switch to be directly connected to the afore mentioned power source E without the intermediary of the main switch 12, whereby the switch 37 is operated in operative engagement of the counter plate of the film, being operatively engaged with the afore mentioned change over switch 63. 45 is a fixed resistance while 22 is a reflexibility compensation variable resistance. 61 is an impedance conversion operational amplifier, whereby the fixed resistances 48, 49 and 50 have been adjusted in such a manner that the operational amplifier 61 produces the standard voltage $e_T$. 47 is a reflexibility compensating variable resistance in operative engagement of the afore mentioned variable resistance 22, whereby the voltage divided by this variable resistance 47 and the resistance 23 is applied to the positive input terminal of the differential operational amplifier 62 through the resistance 39, whereby the connecting point of the afore mentioned resistance 48 with that 49 is connected to the negative input terminal of the operational amplifier 62 through the resistance 40. 26 is a normally opened switch in operative engagement of the afore mentioned switch 20 for starting the counting, whereby when the switch 26 is closed, the condenser 29 is charged with the time constant determined by the resistance 27 and the condenser 29. 28 is a resistance with a high impedance, whereby the charge stored in the condenser 29 is gradually discharged through the resistance. 30 is an impedance conversing operational amplifier, while 34 is a comparison circuit, whereby when so long as the level of the output voltage $e_a$ of the afore mentioned operational amplifier 30 is lower than that $e_b$ at the lower end of the afore mentioned condenser 19 the level of the output voltage of the comparison circuit is kept low so as to supply current to the rear shutter plane holding magnet 35, while when the level of the voltage $e_a$ is higher than that of $e_b$ the level of the output voltage of the comparison circuit 34 is inverted into a high level so as to interrupt the current supply to the rear shutter plane holding magnet 35. When the level of the voltage $e_a$ is equal to that of the voltage $e_b$, the current supply to the rear shutter plane holding magnet so as to close the shutter.

Figure 20:
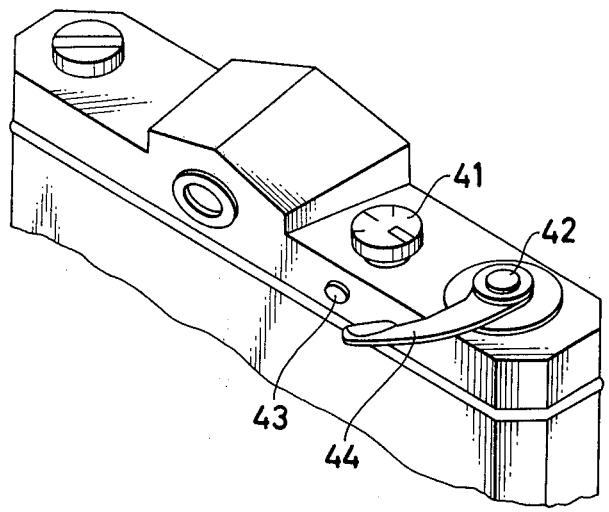
FIG. 20 shows the arrangement of the operation knob for the reflexibility compensation variable resistance shown in FIG. 19.

FIG. 20 shows the reflexibility compensation knob provided on the upper cover of the camera, whereby 41 is the reflexibility compensation knob, which is rotatable only when the lock button 43 is depressed, so as to be able to adjust the value of the afore mentioned variable resistances 22 and 47. Further, by rotating the pulled up knob 41, it is possible to change over the ASA sensitivity of the film. 42 is the shutter button while 44 is the winding up lever.

Figure 21:
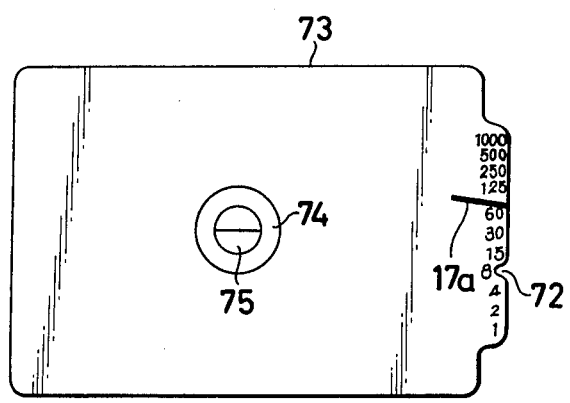
FIG. 21 shows the meter finger shown in FIG. 19, visible in the view finder.

FIG. 21 shows the inside of the view finder, whereby 17a is the finger of the afore mentioned meter 17, 72 the fixed point for the standard level at the time of compensating the film reflexibility, 74 the microprism and 75 the split image.

Below, the operation of the above mentioned disposition will be explained in detail. When at first the back cover is closed after a film is loaded into the camera, the film counter disc shows the mark O or S, whereby the power source switch 37 of the reflexibility compensation light measuring circuit is closed while at the same time the change over switch 63 is connected to the a contact. Thus, the transistor 21 is brought into the switched on state and the light emitting element 2 lights up. When now the light emitting element 2 and the light sensing element 3 are arranged as is shown in FIG. 17, the shutter is kept in the state charged by means of the winding up lever 44, while when the light emitting element 2 and the light sensing element 3 are arranged as is shown in FIG. 18, the shutter is kept in the state before being charged by means of the winding up lever 44. The light sensing element 3 senses the light emitted from the light emitting element 2 and reflected from the leader part of the film 7, whereby the output voltage of the operational amplifier 46 varies in accordance with the light amount sensed by means of the light sensing element 3. Thus a current corresponding to the output of the operational amplifier 46 runs through the meter 17 in such a manner that the finger 17a moves as is shown in FIG. 21. The position of the finger 17a shown in FIG. 21 shows the case when $\alpha$ is larger than 1, whereby a larger current than in case $\alpha$ is equal to 1 runs through the meter 17 so that the finger 17a is larger. When this finger 17a comes to the standard fixed point 72, the afore mentioned variable resistance 22 is set at the smaller resistance value by operating the reflexibility compensation knob 41, in operative engagement with which the resistance value of the afore mentioned variable resistance 47 is lowered. On the other hand, when the finger 17a shows the case when $\alpha$ is smaller than 1 the variable resistance 22 is set at a larger resistance value in order to bring the finger 17a at the standard fixed point 72, so that the value of the variable resistance 47 is also increased. Hereby the standard fixed point 72 shows the position of the finger 17a when $\alpha$ is equal to 1.

When the reflexibility compensation has been adjusted as stated above, the information of the film reflexibility is supplied to the compensation circuit of the exposure time control circuit and stored there as the variation of the value of the variable resistance 47. Hereby, when the reflexibility compensation has been adjusted while the film is fed until the mark 1 or 0 appears on the film counter disc, the power source switch 37 of the reflexibility compensation light measuring circuit is opened while at the same time the change over switch 63 is connected to the b contact.

At the time of taking a picture, with the first stroke of the shutter button 42 the main switch 12 is closed, whereby a voltage is applied all the other circuits than the reflexibility compensation light measuring circuit. In this state, the switch for starting the counting is still closed while the switch 26 is still opened. With the second stroke of the shutter button 42 the mirror is raised up, the diaphragm is closed and the front shutter plane 6 starts to run, when the light sensing element 4 senses the photographing light reflected from the shutter plane and the film plane so as to produce a current proportional to the sensed light amount, whereby the output voltage of the operational amplifier 16 raises by the logarithmically compressed output voltage so as to be proportional to the APEX value of the shutter time. The value is displayed for example in the view finder by means of the meter 17, while the output voltage is applied between the base and the emitter of the transistor 18 so as to produce a collector current corresponding to the logarithmically prolonged output voltage.

Then, synchronized with the start of the front shutter plane after the termination of the afore mentioned mirror up operation, the switch 26 is closed while at the same time the switch 20 for starting the counting is opened. Hereby the output voltage $e_E$ of the differential operational amplifier 62 is represented as follows $$e_E = e_T + (e_c - e_d)$$

whereby
  $e_d$: voltage at the negative input terminal
  $e_c$: voltage at the positive input terminal
  $e_T$: output voltage of the impedance conversion operational amplifier 61.

Namely, the output voltage depends upon the value of the variable resistance 47. The value of the variable resistance 47 changes in accordance with $\alpha$, so that the level of $e_E$ is lower than that of $e_T$ in case $\alpha$ is larger than 1, while the level of $e_E$ is higher than that of $e_T$ in case $\alpha$ is smaller than 1. Further, the resistances 23, 48, 49 and 50 have been adjusted in advance in such a manner that $e_E$ becomes equal to $e_T$ in case $\alpha$ is equal to 1. Thus, when the switch 26 is closed in synchronization with the front shutter plane, the voltage $e_a$ at the positive input terminal of the impedance conversion operational amplifier 30 varies as is shown by A, B and C in FIG. 22 along with the elapse of time, whereby $\alpha$ serves as parameter.

In the drawing, $e_{E1}$ represents $e_E$ in case $\alpha$ is smaller than 1, while $e_{E2}$ represents $e_E$ in case $\alpha$ is larger than 1. The output voltage of the operational amplifier 30 corresponding to the above voltage variation is applied to the positive input terminal of the comparison circuit 34.

On the other hand, when the switch 20 for starting the counting is opened, the timing condenser 19 is charged with the collector current of the transistor 18, so that the voltage $e_b$ at the negative input terminal of the comparison circuit 34 varies as is shown by the straight line D in the drawing along with the lapse of time. Hereby $E_c$ in the drawing is the electromotive force of the power source E.

Thus, in case $\alpha$ is equal to 1, the rear shutter plane starts to run at the crossing point $t_0$ of the straight line D with that B so as to terminate the exposure. Hereby, it is as is explained in accordance with FIG. 1 that the exposure amount is not proper when the shutter is closed at $t_0$ in case $\alpha$ is not equal to 1. Namely, the over compensation is necessary in case $\alpha$ is larger than 1 while the under compensation is necessary in case $\alpha$ is smaller than 1. Thus the standard voltage $e_a$ is shifted into low level along the lapse of time in case $\alpha$ is larger than 1 while the standard voltage $e_a$ is shifted into high level along the lapse of time in case $\alpha$ is smaller than 1 so that the shutter closes at $t_2$ in case $\alpha$ is larger than 1 while it closes at $t_1$ in case $\alpha$ is smaller than 1, whereby the afore mentioned compensation is automatically effected. Namely, the over compensation ($t_2 - t_0$) is automatically effected in case $\alpha$ is larger than 1 while the under compensation ($t_0 - t_1$) is automatically effected in case $\alpha$ is smaller than 1.

Figure 22:
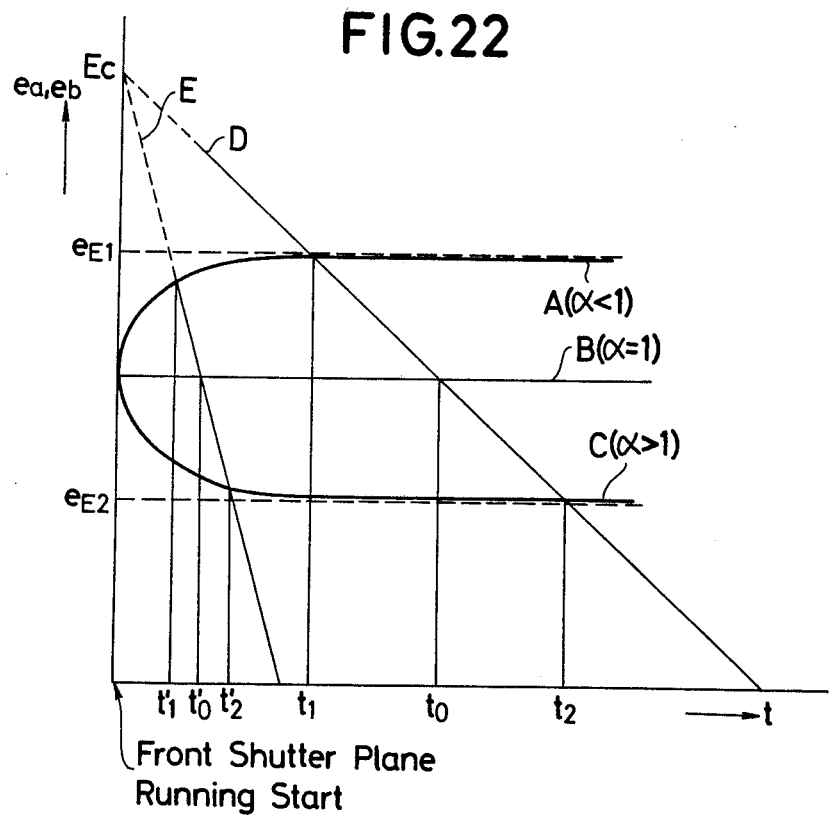
FIG. 22 shows the characteristics for showing the variation of the negative input voltage and the positive input voltage of the comparison circuit 34 shown in FIG. 19 with reference to the lapse of time.

Further, when the shutter time is short, namely the light sensing element 3 senses much light amount the then voltage $e_b$ varies along the straight line E as is shown in FIG. 22. Thus, the then compensation amounts are ($t_2' - t_0$) and ($t_0' - t_1'$), which are smaller than in the afore mentioned case. This meet the demand that the shorter the shutter time is, the smaller the compensation amount is to be, as is explained in accordance with FIG. 1.

Figure 23:
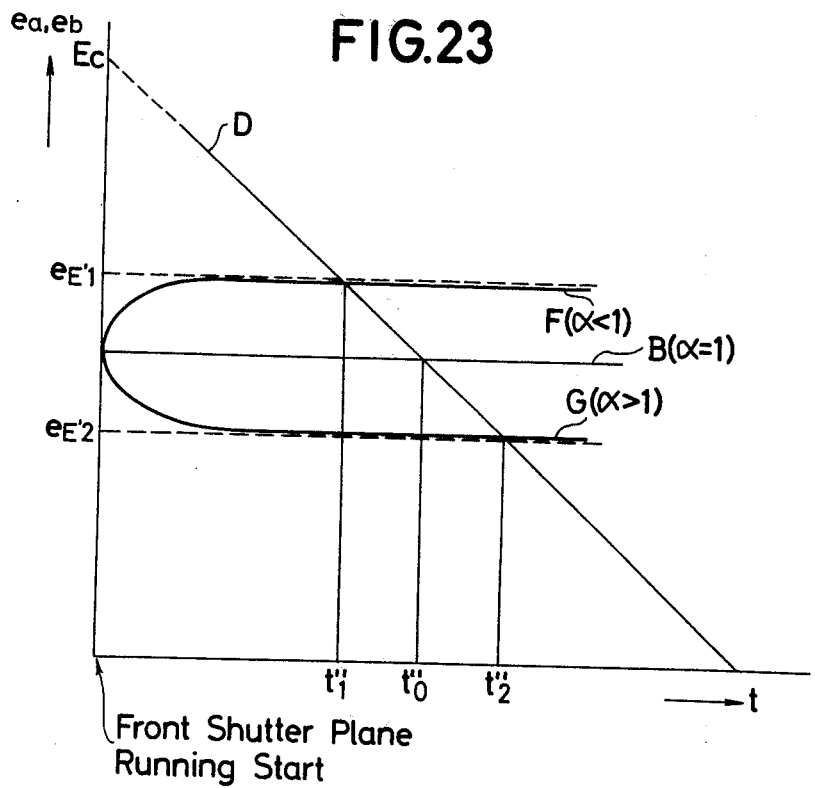
FIG. 23 shows the characteristics shown in FIG. 22, whereby the fluctuation of the flexibility of the film is small.

FIG. 23 shows the variation of the voltage $e_a$ along with the lapse of time in case the deviation of $\alpha$ from 1 is smaller than in case shown in FIG. 22, whereby the variation of the variable resistances 22 and 47 is small so that the variation of the voltage $e_a$ is naturally small. Thus, the then compensation amounts are ($t_2'' - t_0''$), and ($t_0'' - t_1''$), which are smaller than ($t_2 - t_0$) and ($t_0 - t_1$) in the case shown in FIG. 22. This also meets the demand that the smaller the deviation of $\alpha$ from 1 is, the smaller the compensation amount is to be, as is explained in accordance with FIG. 1.

As explained above in accordance with the exposure amount control system of the present embodiment, the improper exposure amount due to the change of the shutter time is automatically compensated while the leader part of the film is illuminated with a standard light source, whereby the reflected light is sensed by a light sensing element and the movement of a meter is manually adjusted in such a manner that the reflexibility of the film plane is compensated.

Below the fifth embodiment of the present invention will be explained in accordance with FIGS. 24 to 28, whereby the light emitting element and the light sensing element are arranged in the same way as in case of the fourth embodiment shown in FIG. 17.

Figure 24:
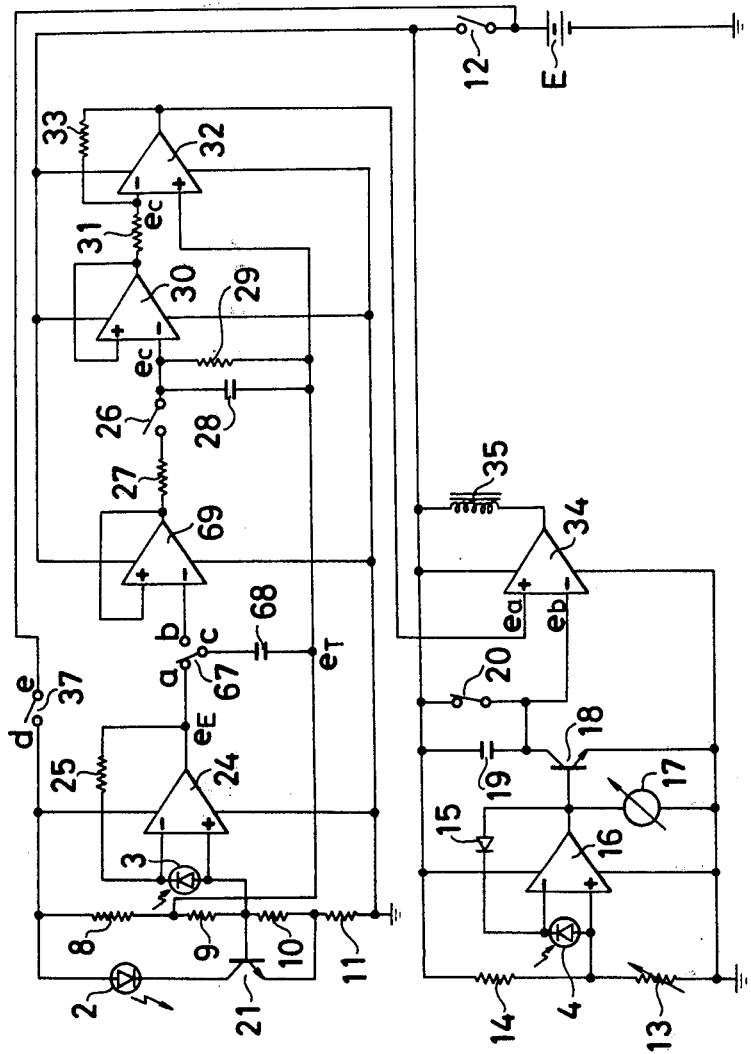
FIG. 24 shows the exposure amount control circuit of the fifth embodiment in accordance with the present invention.

FIG. 24 shows the time control circuit, whereby the members having the same figures as those in FIG. 17 are the same members.

In the drawing, E is the power source, 12 the normally opened main switch, 13 the film sensibility information input variable resistance, 14 a resistance, 4 the afore mentioned exposure control light sensing element, 16 an operational amplifier, 15 a logarithmically compressing diode provided in the feed back circuit of the operational amplifier 16 and 17 the meter for displaying the output of the operational amplifier 16, namely the shutter time. 18 is a transistor for producing a collector current corresponding to the logarithmically prolonged output voltage if the operational amplifier 16, 19 a condenser to be charged with the collector current of the transistor 18, 20 is the afore mentioned light emitting element for illuminating the leader part of the film 7, 21 a transistor connected in series with the light emitting element, and 3 the afore mentioned film plane reflexibility compensation light sensing element for sensing the light emitted from the light emitting element 2 and reflected from the leader part of the film 7. 24 is an operational amplifier whose output voltage varies in accordance with the light amount sensed by the afore mentioned light sensing element 3. 8, 9, 10 and 11 are fixed resistances, which have been adjusted in advance that the output voltage $e_E$ of the operational amplifier 24 is equal to the voltage $e_T$ at the connecting point of the resistances 8 and 9 when $\alpha$ is equal to 1. 37 is the power source switch of the reflexibility compensation light measuring circuit to be directly connected to the afore mentioned power source E without intermediary of the main switch, whereby the switch 37 is opened and closed with the stroke of the film counter and the shutter button. 68 is a memory condenser and 67 is a change over switch to be changed over in operative engagement with the film counter, whereby when the change over switch is connected to the a contact the output terminal of the operational amplifier 24 while when the change over switch is connected to the b contact the condenser 68 is connected to the negative input terminal of the operational amplifier 69. 26 is a normally opened switch in operative engagement of the afore mentioned switch 20 for starting the counting, whereby when the switch 26 is closed, the condenser 28 is charged with a time constant determined by the resistance 27 and the condenser 28. 29 is a resistance with a high impedance, through which the charge stored in the condenser 28 is gradually discharged. 30 is an impedance conversion operational amplifier and 32 an inversing operational amplifier, whereby the output voltage of the afore mentioned operational amplifier 30 is inversedly amplified by the ratio of the resistance 31 to that 33 and appears at the output terminal of the operational amplifier 32. 34 is a comparison circuit, whose output voltage is kept at low level so as to supply current to the rear shutter plane holding magnet 35 so long as the level of the output voltage $e_a$ of the afore mentioned operational amplifier 32 is lower than that of the voltage $e_b$ at the lower end of the afore mentioned condenser 19, while when the level of the standard voltage $e_a$ is higher than that of $e_b$, the output voltage of the comparison circuit 34 is inversed into high level so as to interrupt the current supply to the rear shutter plane holding magnet 35. Namely the level of the standard voltage $e_a$ is equal to that of $e_b$, the current supply to the rear shutter plane holding magnet 35 is interrupted so as to release the shutter.

Figure 25:
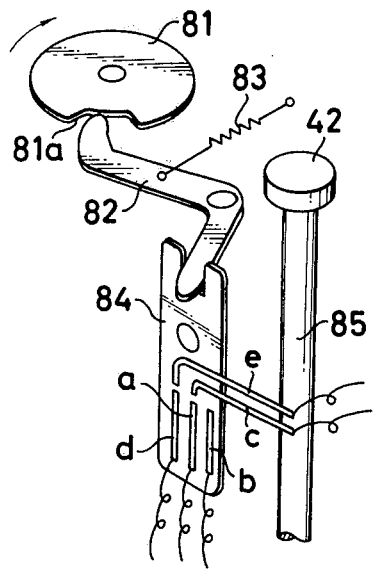
FIG. 25 shows the disposition of the switch 37 and the change over switch 67 shown in FIG. 24.

FIG. 25 shows how the reflexibility compensation light measuring switch 37 and the change over switch 67 is operatively engaged with the film counter, whereby 81 is the counter disc having a notch 81a, being rotatable along the direction of the arrow by means of the film winding up operation. 82 is the lever urged along the clockwise direction by means of a spring 83, whereby the one end of the lever 82 is engaged in the notch 81a of the counter disc 81 while the other end is engaged with the rotary plate 84 in the state shown in the drawing. On this rotary plate, the fixed contact d of the switch 37 and those a and b of the change over switch 67 are provided. 42 is the shutter button, on whose shaft 85 a movable contact e of the switch and the movable contact c of the change over switch 67 are mounted. When the shutter button 42 is depressed in the state shown in the drawing, namely when the leader part of the film is within the picture frame, the movable contact e of the switch 37 is firstly brought into contact with the fixed contact d and then the movable contact c of the change over switch 67 is brought into contact with the fixed contact a, whereby when the film has been fed up to the position for the start of photographing, when the one end of the lever 82 is disengaged out of the notch 81a of the counter disc 81 so that the lever 82 is rotated along the counter-clockwise direction so as to rotate the rotary plate 84 along the clockwise direction. When the shutter button 42 is depressed in this state, the movable contact c of the change over switch 67 is brought into the contact with the fixed contact b while the movable contact e is not brought into contact with the fixed contact d.

Below the operation of the above mentioned disposition will be explained in detail.

When the shutter button 42 is depressed after the shutter has been charged at the time of film feeding without taking a picture, the movable contact e is brought into the fixed contact d so as to close the switch 37 and then the movable contact c is brought into the fixed contact a in such a manner that the change over switch 67 is connected to the fixed contact a. In the same way as in case of the first embodiment, the light emitting element 2 lights up, whereby the light emitted from the light emitting element 2 and reflected from a part of the leader part of the film 7 is sensed by the light sensing amount in such a manner that a voltage corresponding to the light amount sensed by the light sensing element 3 is produced by the operational amplifier 24 so as to be memorized in the condenser 68. When the shutter button 42 is depressed in order to take a picture after the termination of the film feeding without photographing, the movable contact e is not brought into contact with the fixed contact d whereby the switch 37 remains opened while the light emitting element 2 does not light up. Further, the movable contact c is brought into contact with the fixed contact b so that the change over switch 67 is connected to the fixed contact b. With the next depression of the shutter button 42, the main switch 12 is closed in such a manner that a voltage is applied to all other circuit than the reflexibility compensating light measuring circuit. In this state, the switch 20 for starting the counting is closed, while the switch 26 remains still opened. When the shutter button 42 is further depressed, the mirror is raised up, the diaphragm is closed and the front shutter plane 6 starts to run. Thus, the light sensing element 4 senses the photographing light reflected from the shutter plane and the film plane so as to produce a current proportional to the sensed light amount, whereby the output voltage of the operational amplifier 16 is varied by the logarithmically compressed voltage so as to be proportional to the APEX value of the shutter time. The value is displayed for example in the view finder by means of a meter 17, while the output voltage is applied between the base and emitter of the transistor 18 so as to produce a collector current corresponding to the logarithmically prolonged voltage.

Figure 26:
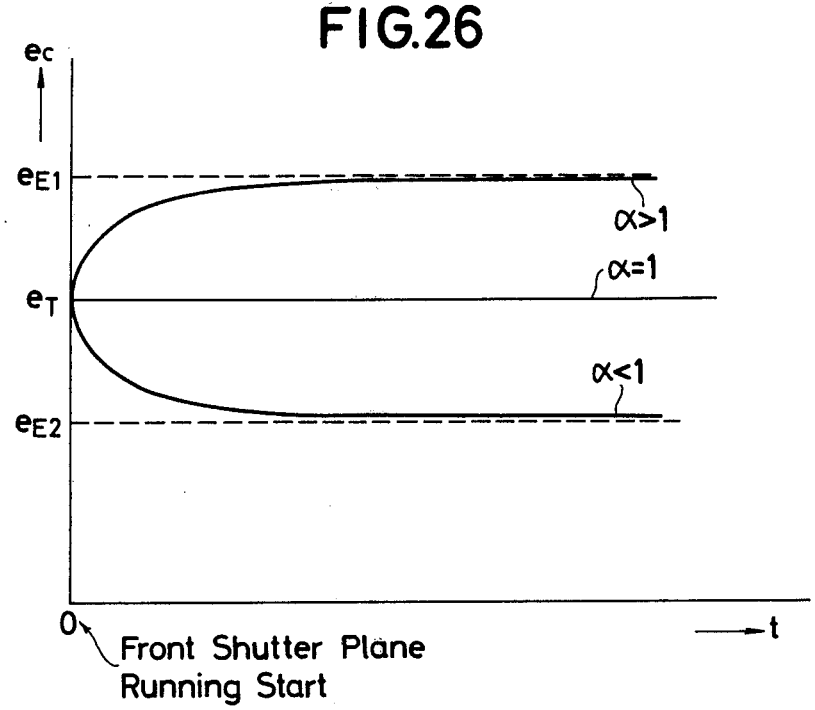
FIG. 26 shows the characteristics for showing the variation of the negative input voltage of the operational amplifier shown in FIG. 24 with reference to the lapse of time.

At the same time with the closure of the switch 26 in synchronization with the start of the front shutter plane after the termination of the mirror up movement, the switch 20 for starting the counting is opened. When the switch 20 is closed, the condenser 28 is charged with the output of the operational amplifier 69 in accordance with the value stored in the afore mentioned memory condenser 68 so that the voltage $e_c$ at the negative input terminal of the impedance conversion operational amplifier changes along with the lapse of time as is shown in FIG. 26. Namely, when $\alpha$ is larger than 1, $e_E$ is larger than $e_T$ so that the level of $e_E$ is higher than that of $e_T$, while in case $\alpha$ is smaller than 1, $e_E$ is smaller than $e_T$ so that the level of $e_E$ is lower than that of $e_T$. Hereby in the drawing, $e_{E1}$ represents $e_E$ in case $\alpha$ is larger than 1, while $e_{E2}$ represents $e_E$ in case $\alpha$ is smaller than 1.

The voltage $e_c$ is inversedly amplified by means of the inversing operational amplifier 32 so as to be applied to the positive input terminal of the comparison circuit 34. Thus, the voltage $e_a$ is inversed in accordance to the values of the resistances 31 and 33, changing along with the lapse of time as is shown with A, B, and C.

Figure 27:
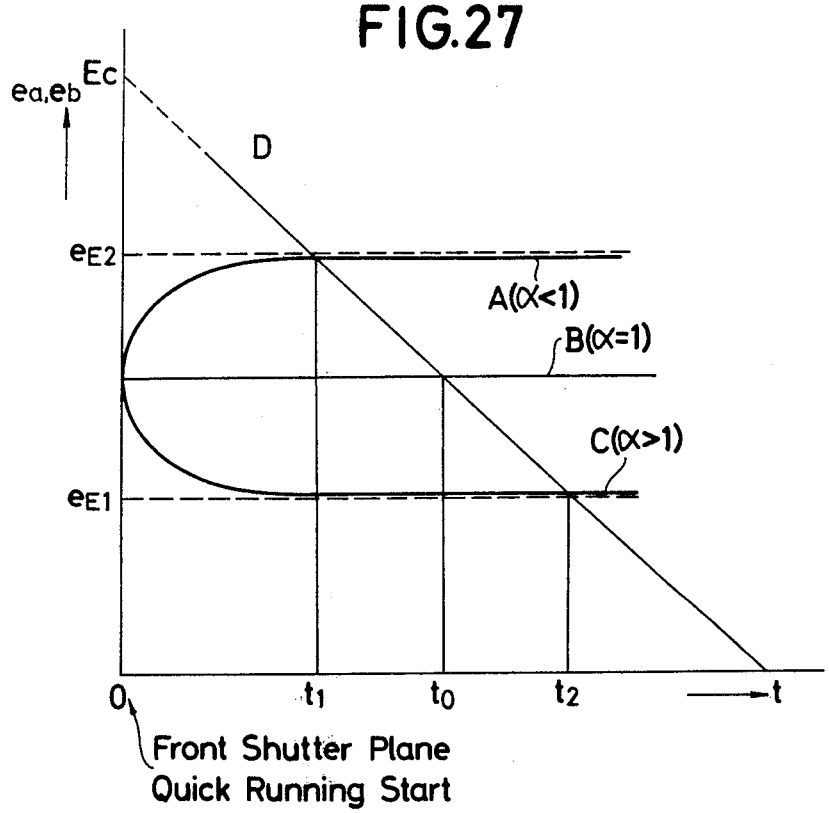
FIG. 27 shows the characteristics for showing the variation of the negative input voltage and the positive input voltage of the comparison circuit 34 shown in FIG. 24 with reference to the lapse of time.

On the other hand, at the same time with the start of the front shutter plane the switch 20 for starting the counting is opened and the condenser 19 is charged so that the voltage $e_b$ to be applied to the negative input terminal of the comparison circuit 34 changes as is shown with D in FIG. 27. In the drawing, Ec is the electromotive force of the power source.

When now $\alpha$ is equal to 1, it is natural that the shutter is released at $t_0$, the crossing point of B with D. Hereby, it is as has been explained in accordance with FIG. 1 that a proper exposure can not be obtained if the shutter is released at $t_0$ in case $\alpha$ is not equal to 1 and the voltage $e_b$ varies as is shown with D in the drawing. In case $\alpha$ is larger than 1, the over compensation is necessary, while in case $\alpha$ is smaller than 1 the under compensation is necessary.

Figure 28:
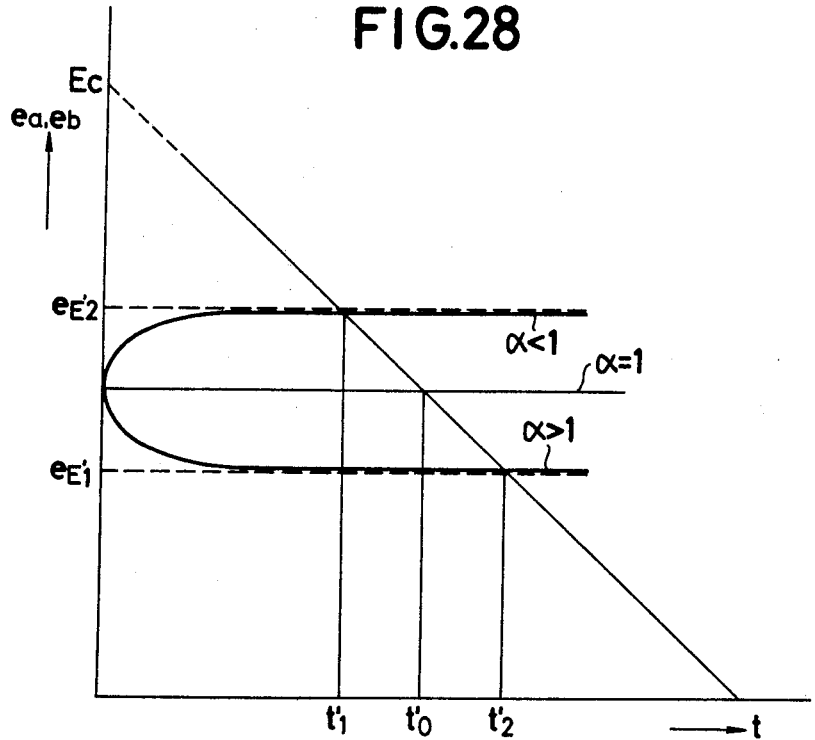
FIG. 28 shows the characteristics shown in FIG. 27, whereby the fluctuation of the reflexibility of the film is small.

FIG. 28 shows the variation of the standard voltage $e_a$ and the timing voltage $e_b$ along with the lapse of time in case the deviation of $\alpha$ from 1 is smaller than in the case shown in FIG. 27. In this case the variation of the output voltage $e_E$ of the operational amplifier 24 is smaller than in the case shown in FIG. 27 so that the upward and the downward shift amount of the standard voltage $e_a$ are also small. Thus, the compensation amount of the shutter time is also smaller than in the case shown in FIG. 27.

As above explained in accordance with the present embodiment the reflexibility of the film is automatically and electrically memorized when the film is fed without photographing and the exposure time is compensated with the afore mentioned memorized amount at the time of the actual photographing.

Below the sixth embodiment in accordance with the present invention will be explained in accordance with FIGS. 29 and 30, whereby the embodiment is similar to the fourth embodiment so that only the different points will be explained below.

Figure 29:
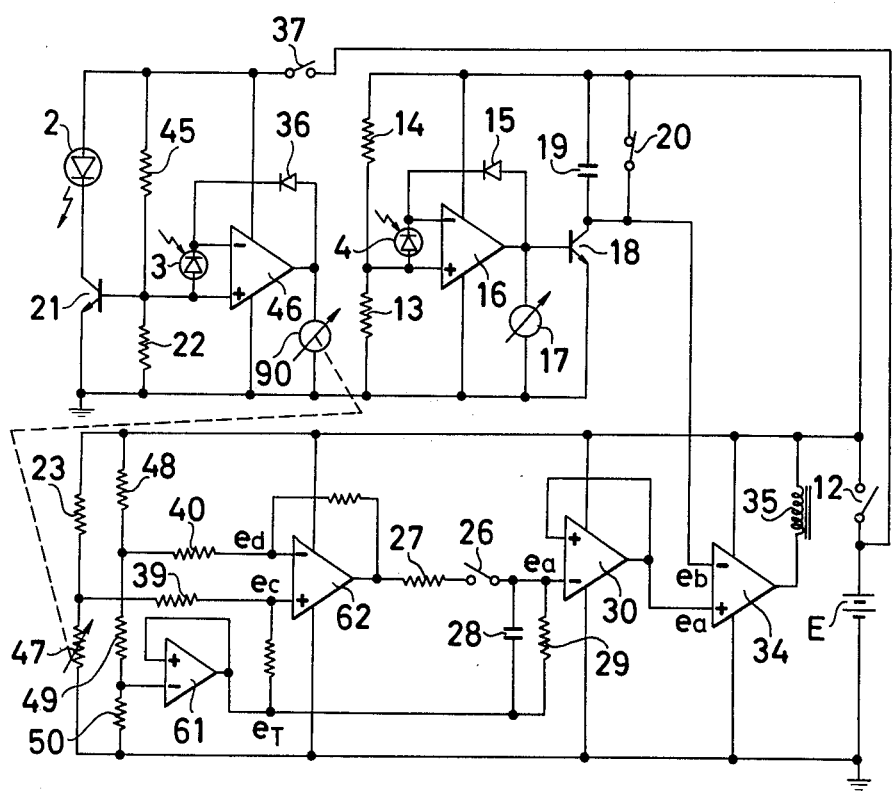
FIG. 29 shows the exposure amount control circuit of the sixth embodiment in accordance with the present invention.

The difference between the embodiment shown in FIG. 29 and that shown in FIG. 19 is the fact that a reflexibility compensating meter 90 is provided so as to be operatively engaged with a variable resistance 47.

Figure 30:
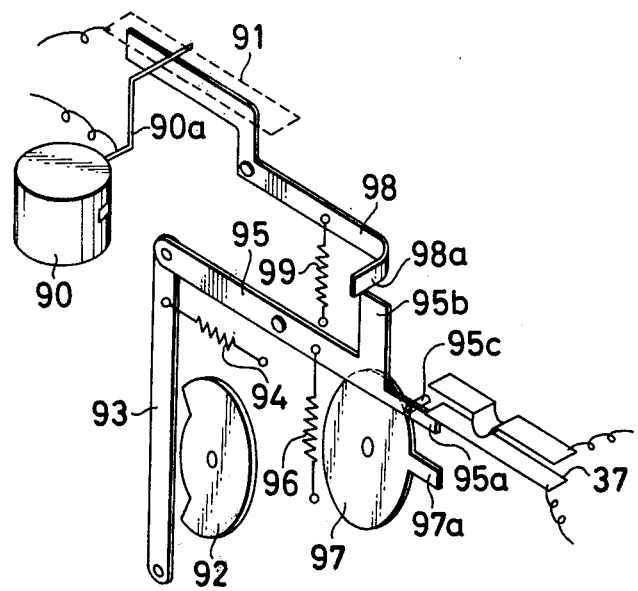
FIG. 30 shows the operative engagement between the meter 90 and the variable resistance 47 shown in FIG. 29.

FIG. 30 shows a concrete disposition. Namely, 90 is a meter while 91 is a resistance for forming the afore mentioned variable resistance 47 together with the finger 90a. 92 is the film counter disc while 93 is a lever urged by means of a spring along the clockwise direction and operatively engaged with the counter and 95 is a winding up lever urged along the clockwise direction by means of a spring 96, whereby the winding up lever is rotatably pivoted to the lever 93 in operative engagement with the one end. 97 is a rotary disc rotatable along the counter clockwise direction in operative engagement with the winding up operation, whereby the projection 97a provided on the rotary disc 97 is engaged with the pin 95c provided on the lever 95 in operative engagement with the winding up operation immediately before the termination of the winding up so as to rotate the lever 95 along the counter clockwise direction. 37 is the power source switch of the reflexibility compensation light measuring circuit, whereby the movable contact of the switch 37 is to be operated by means of the other end 95a of the lever 95. 98 is a clamp lever of the finger 90a, being normally urged along the clockwise direction by means of a spring 99, so as to drive the finger 90a against the resistance 91 in order to prevent the movement of the finger 90a. When the lever 95 is rotated along the counter-clockwise direction, the bent part 98a of the lever 98 is pressed by means of the projection 95b so as to release the pressed finger 90a.

Below the operation of the above mentioned composition will be explained. When the loaded film is in a position ready for photographing, the film counter disc 92 is in the state shown in the drawing. Hereby the rotary plate 97 is rotated along the counter-clockwise direction in operative engagement with the film winding up operation without photographing, whereby immediately before the termination of the film winding up operation the projection 97a is engaged with the pin 95c so as to rotate the lever 95 against the counter-clockwise direction. At first, this lever 95 closes the switch 37 so that the output voltage of the operational amplifier 49 varies in accordance with the light amount sensed by the light sensing element in the same way as in case of the fourth embodiment, whereby the output is displayed with the finger 90a of the meter 90. When the lever 95 is further rotated, the projection 95b presses the bent part 98a so as to rotate the finger clamping lever 98 against the counter-clockwise direction so as to release the pressed finger 90a. Thus, the finger 90a of the meter is moved into a position corresponding to the output of the operational amplifier 46. With the termination of the winding up operation the rotary plate 47 is rotated along the clockwise direction so that the finger clamping lever 98 is rotated along the clockwise direction by means of the spring 99 so as to press the finger 90a, opening the switch 37. In consequence, the value of the variable resistance 47 is determined in accordance with the position at which the finger 90a is clamped and transmitted to the compensation circuit of the shutter time control circuit so as to be stored there.

When then the loaded film reaches the position for starting the photographing, the phase of the notch of the counter plate 92 is different from that shown in the drawing, whereby the lever 93 is rotated against the counter-clockwise direction so that even when the operative engagement of the switch 37 with the finger clamping lever 98 is released and the winding up operation is not effected any more, the lever 95 does not release the clamped finger 90a, without opening the switch 37. The operation after the above is same as in case of the fourth embodiment.

In case of the afore mentioned embodiment, the reflexibility compensation light sensing element 3 senses the light reflected from the film plane, while it goes without saying that the light sensing element 3 can also be provided behind the film so as to sense the light passing through the film.

Hereby, the variation of the charging voltage of the condenser 19 of the afore mentioned embodiment is represented in a straight line in FIGS. 5 and 6, FIGS. 10 and 11, FIGS. 15 and 16, FIGS. 22 and 23 and FIGS. 27 and 28, whereby in reality a loose curve may take place. Namely the part in a solid line represents a straight line because the light sensing element senses only the light reflected from the film plane, while the part in a dotted line represents a loose curve in praxis because the light reflected from the shutter plane is also added. In consequence, in case the shutter is controlled with a shorter time, the part in a solid line is decreased, while the part in a dotted line is increased. On the other hand, in case the shutter is controlled with a longer time, the part in a solid line is increased, while the part in a dotted line is decreased.

Figure 31:
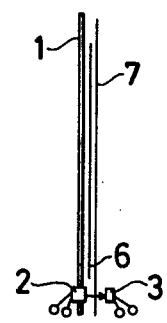
FIG. 31 shows a film reflexibility compensation light sensing element provided behind the film.

Hereby, it is sufficient to arrange the light sensing element 3 as is shown in FIG. 31, in case the film plane reflexibility compensation light sensing element 3 is arranged behind the film so as to sense the light passing through the film.

As explained above in detail in accordance with the present invention, even if the film reflexibility changes in accordance with the kind of the loaded film, standard voltage level for the exposure time setting is automatically changed so that a proper exposure can always be obtained despite of the change of the reflexibility of the film, whereby even if the ratio of the light reflected from the film plane to the light reflected from the shutter plane changes due to the change of the shutter time, the exposure time is automatically properly compensated, so that an exposure amount control device for a camera by means of which a more proper exposure amount can be obtained than the conventional camera of the film plane light measuring system can be offered.

What is claimed is:

1. An exposure amount control device for a camera comprising:
   a light emitting means capable of illuminating the film portion outside of picture frame,
   a first light measuring means capable of measuring the light emitted from the light emitting means and reflected from the film portion outside of picture frame, said means producing an electrical signal corresponding to the light reflected from the film portion outside of picture frame,
   a second light measuring means capable of measuring the light reflected from the shutter plane and the film picture plane, said means producing an electrical signal corresponding to the light reflected from the shutter plane and the film picture plane,
   a photographing information setting means, said means producing an electrical signal corresponding to the set photographing information,
   a computing means for computing the electrical signal output from the second light measuring means and the electrical signal output from the photographing means, said means producing an electrical signal corresponding to the computed value,
   a standard signal producing means, said means producing an electrical signal whose level is equal to that of the electrical signal produced by the first light measuring means when the reflexibility of the shutter plane is equal to that of the film plane,
   a detecting means for comparing the electrical signal output of the first light measuring means with that of the standard signal producing means so as to detect the difference between the both electrical signals, said means producing an electrical signal in accordance with the difference between the both electrical signals, and
   a shutter time determining means for determining the exposure time of the shutter in accordance with the electrical signal output of the computing means, said means including a compensating means for compensating the exposure time with the electrical signal output of the detecting means so as to obtain a proper exposure time.

2. An exposure amount control device in accordance with claim 1 further comprising;
   a storage means inserted between the first light measuring means and the detecting means, said means storing the electrical signal output of the first light measuring means, taking the electrical signal output of the standard signal producing means for standard.

3. An exposure amount control device in accordance with claim 2, wherein the storing means including a resistance and a condenser, whereby the electrical signal output of the first light measuring means is stored in the condenser through the resistance.

4. An exposure amount control device in accordance with claim 3, wherein the storing means including a switch means to be closed in operative engagement with the shutter operation, whereby the condenser stores the electrical signal output of the first light measuring means through the resistance with the closure of said switch means.

5. An exposure amount control device in accordance with claim 1, wherein the reflexibility of the shutter plane is set smaller than the smallest reflexibility of the films to be loaded in camera.

6. An exposure amount control device for a camera comprising;
a first light measuring means capable of measuring the light reflected from the shutter plane and the film plane, said means producing an electrical signal corresponding to the light reflected from the shutter plane and the film plane,
a change over means connected to the output terminal of the first light measuring means, said means being changed over into a first position before taking a picture and into a second position at taking a picture,
a memory means for memorizing the electrical signal output from the first light measuring means corresponding to the light reflected from the shutter plane when the change over means is in the first position,
a comparison means for comparing the electrical signal output of the first light measuring means corresponding to the light reflected from the film plane with the value memorized in the memory means when the change over means is in the second position, said means producing an electrical signal corresponding to the difference between the outputs of the both means,
a second light measuring means capable of measuring the light reflected from the shutter plane and the film plane, said means producing an electrical signal corresponding to the light reflected from the shutter plane and the film plane,
a photographing information setting means, said means producing an electrical signal corresponding to the set photographing information,
a computing means for computing the electrical signal output of the second light measuring means and that of the photographing information setting means, said means producing an electrical signal corresponding to the computed value, and
a shutter time determining means for determining the exposure time corresponding to the electrical signal output of the computing means, said means including a compensating means for compensating the exposure time with the electrical signal output of the comparison means so as to obtain the proper exposure time.

7. An exposure amount control device in accordance with claim 6, wherein the memory means being a condenser.

8. An exposure amount control means in accordance with claim 6 further comprising;
a standard producing means, said means producing an electrical signal corresponding to the standard level to be set,
a detecting means for detecting the difference between the electrical signal output of the comparison means and that of the standard signal producing means, the output of said detecting means influencing the compensating means.

9. An exposure amount control device for a camera comprising;
a light emitting means capable of illuminating the film portion outside of picture frame,
a first light measuring means capable of measuring the light emitted from the light emitting means and reflected from the film portion outside of picture frame,
a first adjusting means for adjusting the electrical signal output of the first light measuring means,
an indication means for indicating the output of the first light measuring means, said means including a standard point to be indicated when the reflexibility of the shutter plane is equal to that of the film plane,
an operation means for operating the first adjusting means in such a manner that the indication means indicates the standard point,
a standard signal producing means for producing an electrical signal corresponding to the set standard level,
a compensation signal producing means for producing an electrical signal corresponding to the adjusting amount of the adjusting means,
a comparison means for comparing the electrical signal output of the standard signal producing means with that of the compensation signal producing means, said means producing an electrical signal corresponding to the difference between the outputs of the both means,
a second light measuring means capable of measuring the light reflected from the shutter plane and the film picture plane, said means producing an electrical signal corresponding to the light reflected from the shutter plane and the film picture plane,
a photographing information setting means, said means producing an electrical signal corresponding to the set photographing information,
a computing means for computing the electrical signal output of the second light measuring means and that of the photographing information means, said means producing an electrical signal corresponding to the computed value, and
a shutter time determining means for determining the exposure time corresponding to the electrical signal output of the computing means, said means including a compensation means for compensating the exposure time with the electrical signal of the comparison means so as to obtain the proper exposure.

10. An exposure amount control device in accordance with claim 9, wherein the indication means being a meter.

11. An exposure amount control device in accordance with claim 9, wherein the adjusting means and the adjusting signal producing means respectively including variable resistances operatively engageable with each other.

12. An exposure amount control device for a camera comprising;
- a light emitting means capable of illuminating a portion of a film outside a picture frame thereof,
- a first light measuring means capable of measuring the light transmitting from the portion outside the picture frame, emitted from the light emitting means, said means producing an electrical signal corresponding to the light passing through the film portion outside of the picture frame,
- a memory means for memorizing the output of the first light measuring means,
- a second light measuring means for measuring the light reflected from the shutter plane and the film picture plane, said means producing an electrical signal corresponding to the light reflected from the shutter plane and the film picture plane,
- a photographing information setting means, said means producing an electrical signal corresponding to the set photographing information,
- a computing means for computing the electrical signal output of the second light measuring means and that of the photographing information setting means, said means producing an electrical signal corresponding to the computed value,
- a standard signal producing means, said means producing an electrical signal whose level is equal to that of the electrical signal produced by the first light measuring means, when the reflexibility of the shutter plane is equal to that of the film plane,
- a detecting means for comparing the electrical signal output of the first light measuring means with that of the standard signal producing means so as to detect the difference between the both outputs, said means producing an electrical signal corresponding to the difference between the both outputs, and
- a shutter time determining means for determining the exposure time of the shutter in accordance with the electrical signal output of the computing means, said means including a compensation means for compensating the exposure time with the electrical signal output of the detecting means so as to obtain the proper exposure time.

13. An exposure amount control device for a camera comprising;
- a light emitting means capable of illuminating the film portion outside of picture frame,
- a first light measuring means capable of measuring the light emitted from the light emitting means and reflected from the film portion outside of picture frame, said means producing an electrical signal corresponding to the light reflected from the film portion outside of picture frame,
- an indication means for indicating the output of the first light measuring means,
- a standard signal producing means for producing an electrical signal corresponding to the standard level to be set,
- a compensation signal producing means for producing an electrical signal corresponding to the amount indicated by the indicating means,
- a comparison means for comparing the electrical signal output of the standard signal producing means with that of the standard signal producing means, said means producing an electrical signal corresponding to the difference between the outputs of the both means,
- a second light measuring means capable of measuring the light reflected from the shutter plane and the film picture plane, said means producing an electrical signal corresponding to the light reflected from the shutter plane and the film picture plane,
- a photographing information setting means, said means producing an electrical signal corresponding to the set photographing information,
- a computing means for computing the electrical signal from the second light measuring means and that from the photographing information setting means, said means producing an electrical signal corresponding to the computed value, and
- a shutter time determining means for determining the exposure time in accordance with the electrical signal output of the computing means, said means including a compensating means for compensating the exposure time with the electrical signal output of the comparison means so as to obtain the proper exposure time.

* * * * *